(12) United States Patent
Ichikawa

(10) Patent No.: US 10,754,118 B2
(45) Date of Patent: Aug. 25, 2020

(54) LENS BARREL AND IMAGING DEVICE EQUIPPED WITH SAME

(71) Applicant: Panasonic Intellectual Property Management Co., Ltd., Osaka (JP)

(72) Inventor: Taku Ichikawa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 53 days.

(21) Appl. No.: 16/284,654

(22) Filed: Feb. 25, 2019

(65) Prior Publication Data

US 2019/0265431 A1   Aug. 29, 2019

(30) Foreign Application Priority Data

Feb. 27, 2018   (JP) .................................. 2018-032685

(51) Int. Cl.
    *G02B 7/20*   (2006.01)
    *G02B 7/02*   (2006.01)

(52) U.S. Cl.
    CPC .................................... *G02B 7/021* (2013.01)

(58) Field of Classification Search
    CPC .......... G02B 7/021; G02B 5/005; G03B 9/18; G03B 9/22; G03B 9/26
    See application file for complete search history.

(56) References Cited

U.S. PATENT DOCUMENTS

| 2003/0049031 | A1  | 3/2003 | Nagae |
| 2004/0165880 | A1  | 8/2004 | Ichino |
| 2012/0045198 | A1* | 2/2012 | Miyoshi ................ G03B 17/04 |
|              |     |        |                            396/448 |

FOREIGN PATENT DOCUMENTS

| JP | 2003-084333 A | 3/2003 |
| JP | 2004-258120 A | 9/2004 |
| JP | 2004-264511 A | 9/2004 |
| JP | 2008-070630 A | 3/2008 |
| JP | 2017-120312 A | 7/2017 |

* cited by examiner

*Primary Examiner* — Joseph P Martinez
(74) *Attorney, Agent, or Firm* — Renner, Otto, Boisselle & Sklar, LLP

(57) ABSTRACT

A lens barrel 10 comprises a first lens group frame 29, a rotating shaft 30, a plurality of barrier vanes 23a to 26b, an annular barrier sliding frame 28, and an annular stationary frame 27. The plurality of barrier vanes 23a to 26b rotate around the rotating shaft 30, and switch between an open state of exposing the surface of a first lens L1 in an imaging state, and a closed state of covering the surface of the first lens L1 in a collapsed state. The annular barrier sliding frame 28 is disposed on the subject side of the first lens group frame 29, and rotates the plurality of barrier vanes 23a to 26b upon rotating relatively around the optical axis with respect to the first lens group frame 29. The stationary frame 27 is disposed between the plurality of barrier vanes 23a to 26b and the barrier sliding frame 28 and fixed with respect to the first lens group frame 29, and supports the plurality of barrier vanes 23 a to 26b from the opposite side from the subject.

14 Claims, 24 Drawing Sheets

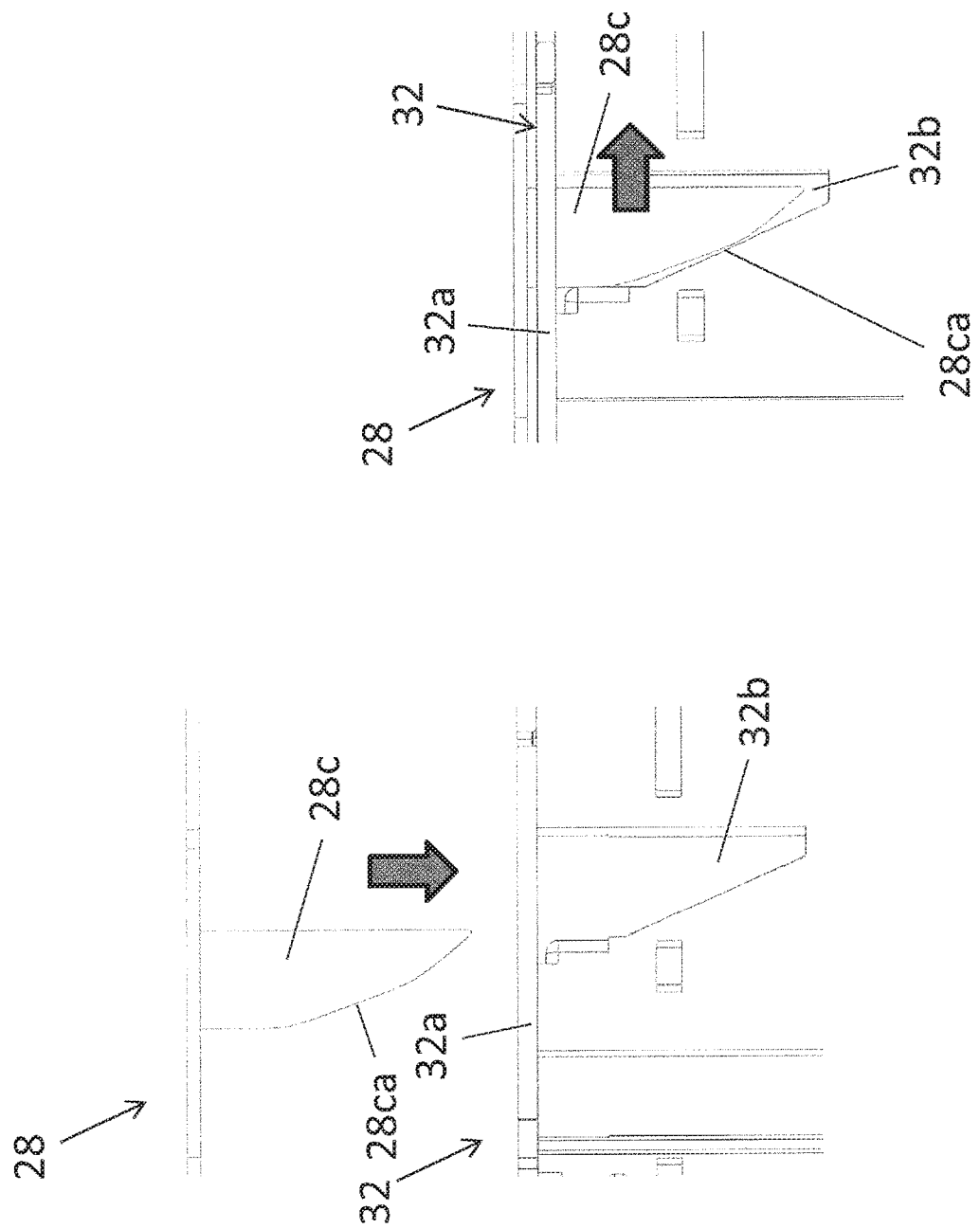

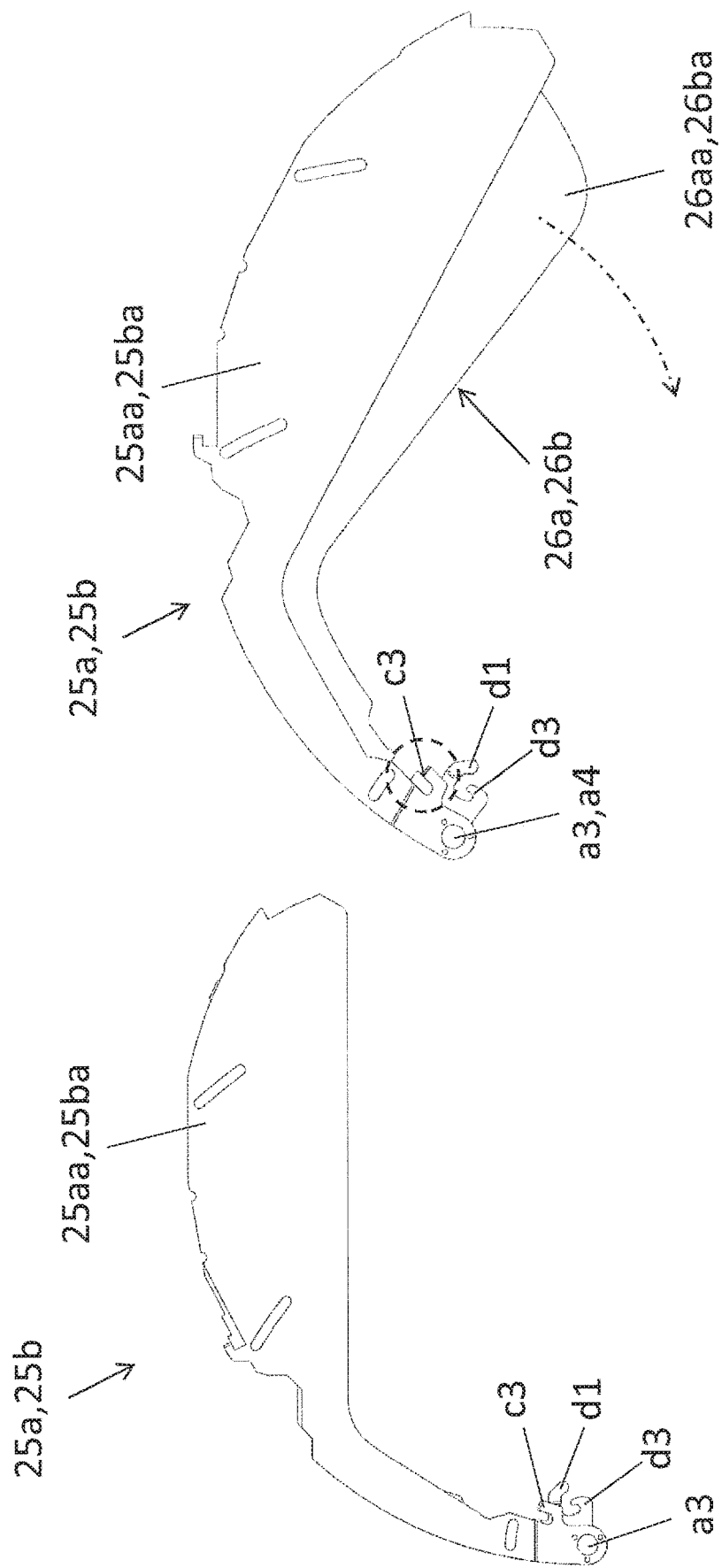

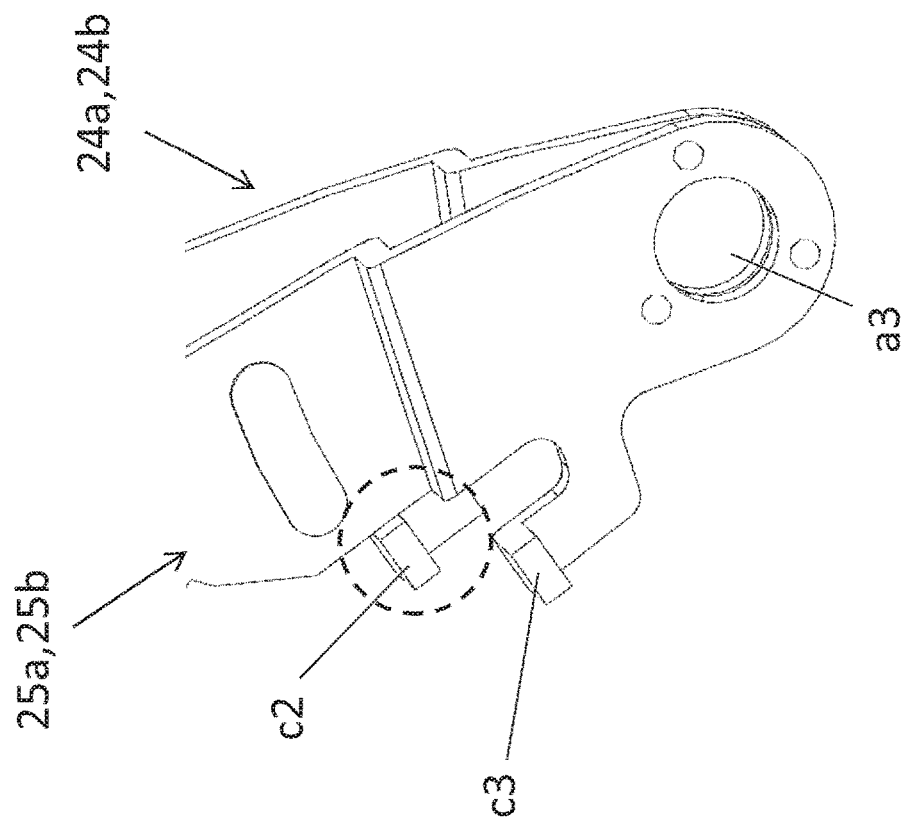
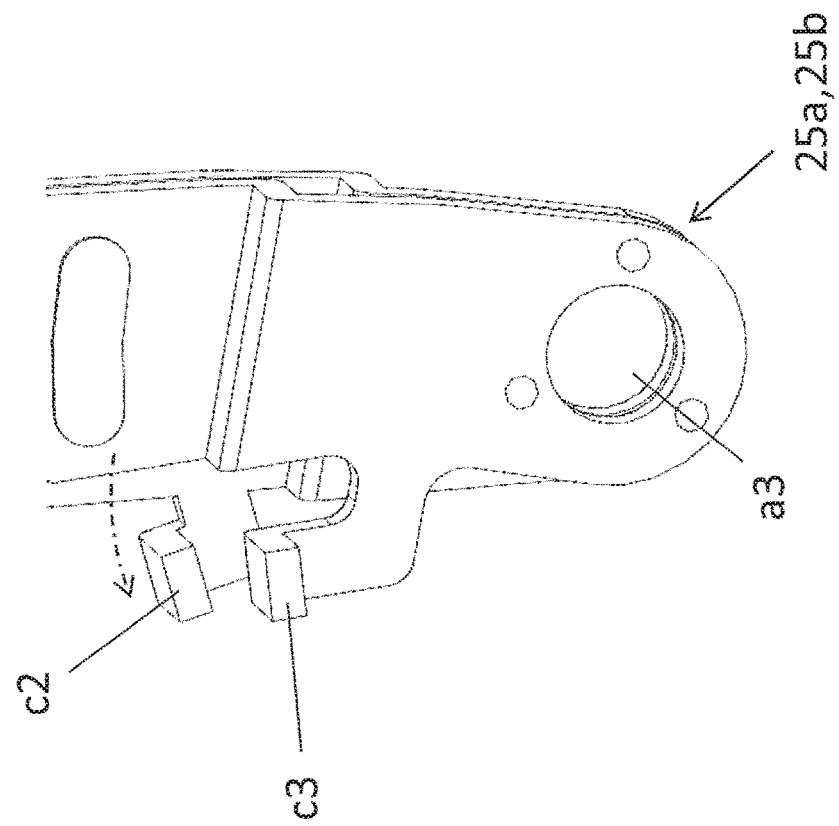
FIG. 21B
FIG. 21A

LENS BARREL AND IMAGING DEVICE EQUIPPED WITH SAME

CROSS-REFERENCE TO RELATED APPLICATIONS

This application claims priority to Japan Patent Application No. 2018-032685. The entire disclosures of Japan Patent Application No. 2018-032685 are hereby incorporated herein by reference.

BACKGROUND

Technical Field

The present disclosure relates to a lens barrel that is attached to an imaging device such as a digital camera, and to an imaging device comprising this lens barrel.

Description of the Related Art

A lens barrel including a plurality of lenses is attached to an imaging device such as a digital camera.

A barrier mechanism that slides a plurality of barrier vanes is provided in order to protect the lens disposed closest to the subject in the lens barrel.

For instance, Patent Literature 1 (JP-A 2017-120312) discloses a lens barrel in which the barrier vanes disposed at the innermost side in the radial direction among a plurality of barrier vanes included in a barrier mechanism have a stepped shape, which allows the load received from the subject side in a closed state to be borne in a well balanced way, without making the lens barrel larger.

SUMMARY

However, the conventional lens barrel discussed above has the following problems.

Specifically, the lens barrel disclosed in the above-mentioned publication is configured so that the above-mentioned effect is obtained by giving the barrier vanes disposed on the innermost side in the radial direction among the plurality of barrier vanes a complicated, stepped shape.

However, when barrier vanes with a complicated, stepped shape are used, the thickness of the barrier vanes increases in the optical axis direction, so there is the risk that the lens barrel will be larger in the optical axis direction.

Furthermore, as the diameter of lens barrels has been increasing in recent years, with a configuration in which the number of barrier vanes is increased, the outside diameter of the lens barrel can be reduced with respect to the opening covered by the barrier mechanism, but in a closed state the barrier vanes may come loose from the barrier sliding frame.

Technical Problem

It is an object of the present disclosure to provide a lens barrel with which the barrier vanes can be prevented from coming loose while avoiding an increase in the size of the lens barrel, as well as an imaging device comprising this lens barrel.

Solution To Problem

The lens barrel disclosed herein is a lens barrel having an imaging state of being moved toward the subject in the optical axis direction, and a collapsed state in which at least some of a plurality of lenses have been collapsed, said lens barrel comprising a rotating shaft, a plurality of barrier vanes, an annular barrier sliding frame, and an annular stationary frame. The first lens frame has a first lens disposed closest to the subject among the plurality of lenses, and a cylindrical main body that holds the first lens. The rotating shaft is disposed substantially along the optical axis direction and near the outer peripheral portion of the first lens frame in the radial direction. The plurality of barrier vanes rotate around the rotating shaft and switch between an open state in which the vanes expose the surface of the first lens in the imaging state and a closed state in which the vanes cover the surface of the first lens in the collapsed state. The annular barrier sliding frame is disposed on the subject side of the first lens frame and rotates the plurality of barrier vanes during relative rotation around the optical axis with respect to the first lens frame. The annular stationary frame is disposed between the plurality of barrier vanes and the barrier sliding frame and is fixed with respect to the first lens frame, and supports the plurality of barrier vanes from the opposite side from the subject. The plurality of barrier vanes have a first barrier vane group, a second barrier vane group, a first latching component, and a second latching component. The first barrier vane group includes a plurality of barrier vanes that, in the open state, are disposed so as to overlap each other at the end portion of the first lens frame in the optical axis direction, and rotate in conjunction with each other toward the optical axis when there is a change from the open state to the collapsed state. The second barrier vane group includes a plurality of barrier vanes that are disposed at opposing positions around the optical axis with respect to the first barrier vane group in the first lens frame, and that, in the open state, are disposed so as to overlap each other in the optical axis direction at the end portion of the first lens frame, and rotate in conjunction with each other toward the optical axis when there is a change from the open state to the collapsed state. The first latching component and the second latching component are provided to at least one of the barrier vanes included the first barrier vane group and the second barrier vane group, respectively. The first latching component latches part of the barrier vanes adjacent in the optical axis direction when there is a change from the open state to the collapsed state. The second latching component latches part of the barrier vanes adjacent in the optical axis direction when there is a change from the collapsed state to the open state.

With the lens barrel disclosed herein, it is possible to prevent the barrier vanes from coming loose while avoiding an increase in the size of the lens barrel.

BRIEF DESCRIPTION OF DRAWINGS

FIG. 15A is a detail view of how the rectilinear frame and the barrier sliding frame move from a state of being separated from each other to a collapsed state (closed state) in the imaging state (open state), and FIG. 15B is a detail view of a state in which the contacted portions of the barrier sliding frame are mated to the mating portions of the rectilinear frame;

FIGS. 18A and 18B are oblique views of the movement of two barrier vanes disposed in the first and second positions from the innermost side in the radial direction in a transition from the imaging state (open state) to the collapsed state (closed state);

FIG. 21A and 21B are oblique views of the latching relationship when the barrier vanes rotate from FIG. 20A to FIG. 20B;

DESCRIPTION OF EMBODIMENTS

Embodiments will now be described in detail through reference to the drawings as needed. However, unnecessarily detailed explanation may be omitted. For instance, detailed descriptions of things that are already well known, and redundant descriptions of substantially the same configuration may be omitted. This is to avoid unnecessary redundancy in the following description and to facilitate understanding by those skilled in the art.

The applicant has provided the appended drawings and the following description in order to enable a person skilled in the art to sufficiently understand what is disclosed herein, and these are not intended to limit what is given in the Claims.

Embodiment 1

The lens barrel 10 according to one embodiment of the present disclosure will now be described through reference to FIGS. 1 to 24.

Figure 1:
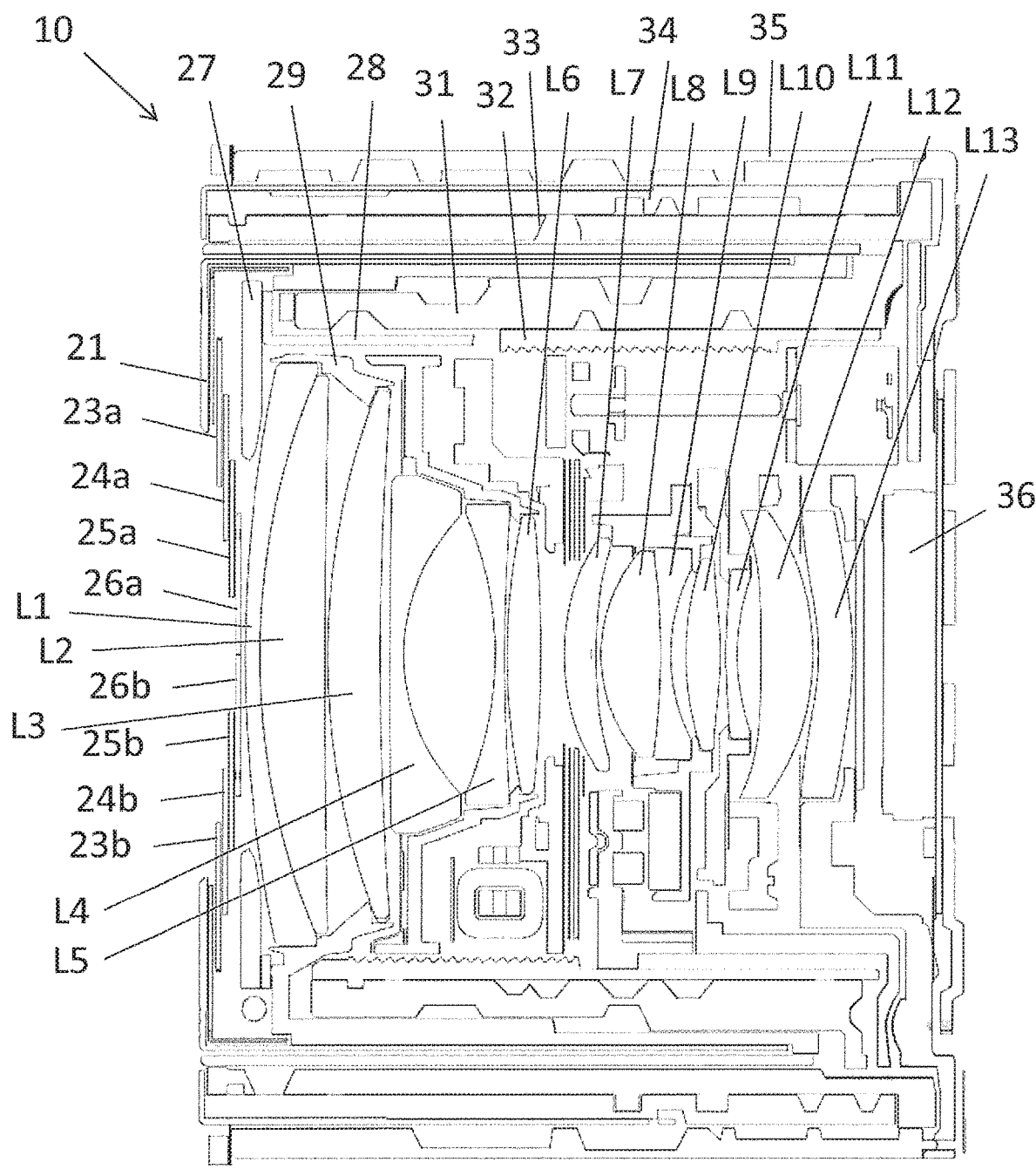
FIG. 1 is a cross section of the collapsed state of the lens barrel according to an embodiment of the present disclosure.
Figure 2:
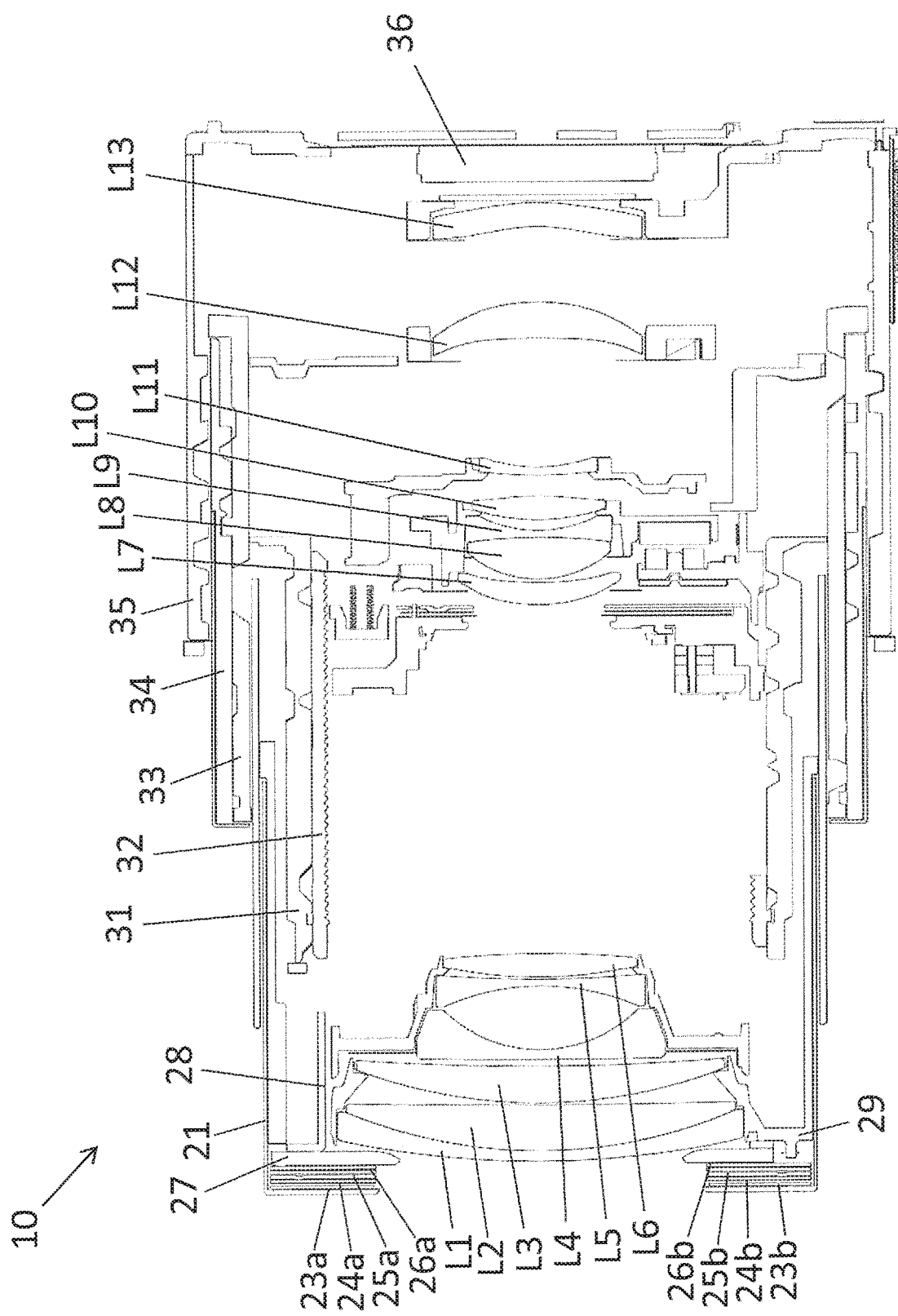
FIG. 2 is a cross section of the imaging state of the lens barrel in FIG. 1.

As shown in FIGS. 1 and 2, the lens barrel 10 according to the this embodiment comprises a barrier mechanism that can switch between an imaging state in which a lens (first lens) L1 disposed closest to the subject is moved along the optical axis direction to the subject side, and a collapsed state in which the plurality of lenses L1 to L13 including the lens L1 have been collapsed to a position where they are close to each other. In the collapsed state shown in FIG. 1, the lens L1 is protected by a plurality of barrier vanes 23a to 26b.

As shown in FIGS. 1 and 2, the lens barrel 10 comprises a first lens group frame 29 including the lens L1, rotating shafts 30, a cylindrical member 21, a front cover 22, the plurality of barrier vanes 23a to 26b, a barrier sliding frame 28, a stationary frame 27, a double-sided cam frame 31, a rectilinear frame 32, a through-cam frame 33, a drive barrel 34, a stationary barrel 35, and an image sensor 36.

The lenses L1 to L3 are disposed along the optical axis direction, with the lens L1 disposed closest to the subject at the front, and are held by the first lens group frame 29.

The lenses L4 to L13 are sequentially disposed on the opposite side (the image sensor 36 side) from the subject of the lenses L1 to L3 held by the first lens group frame 29 in the optical axis direction, and are held by the respective lens frames.

The first lens group frame 29 holds the lenses L1 to L3 as mentioned above. In the collapsed state shown in FIG. 1, the first lens group frame 29 is in a collapsed state of being disposed on the inner peripheral face side of the other cylindrical members (the through-cam frame 33, the drive barrel 34, and the stationary barrel 35). On the other hand, in the imaging state shown in FIG. 2, the first lens group frame 29 is in a state of protruding toward the subject side beyond the other cylindrical members (the through-cam frame 33, the drive barrel 34, and the stationary barrel 35).

Two rotating shafts 30 are disposed along the optical axis direction, at the end face on the subject side of the first lens group frame 29, and serve as the rotational centers of the plurality of barrier vanes 23a to 26a and the barrier vanes 23b to 26b. More precisely, the two rotating shafts 30 are provided at positions opposite each other (the farthest separated positions) in the outer peripheral portion of the substantially rectangular opening 27b of the stationary frame 27 disposed overlapping the opening of the first lens group frame 29.

In order to protect the surface of the lens L1 in the collapsed state shown in FIG. 1, the plurality of barrier vanes 23a to 26b are attached in a state of being rotatable around the rotary shafts 30. When the plurality of barrier vanes 23a to 26b rotate around the rotating shafts 30, they switch between a closed state (collapsed state; see FIG. 6A) in which they cover the opening 27b and an open state (imaging state; see FIG. 6B) in which the four of them are stacked on top of one another at the outer peripheral portion of the substantially rectangular opening 27b.

More precisely, in the first barrier vane group including the four barrier vanes 23a to 26a and the second barrier vane group including the four barrier vanes 23b to 26b, the barrier vanes 23a to 26a and the barrier vanes 23b to 26b are disposed overlapping each other in the optical axis direction. The barrier vanes 23a to 26a rotate around a common rotating shaft 30. The barrier vanes 23b to 26b rotate also around a common rotating shaft 30 disposed on the opposite side, in the radial direction, from the rotating shaft 30 of the barrier vanes 23a to 26a.

Figure 3A:
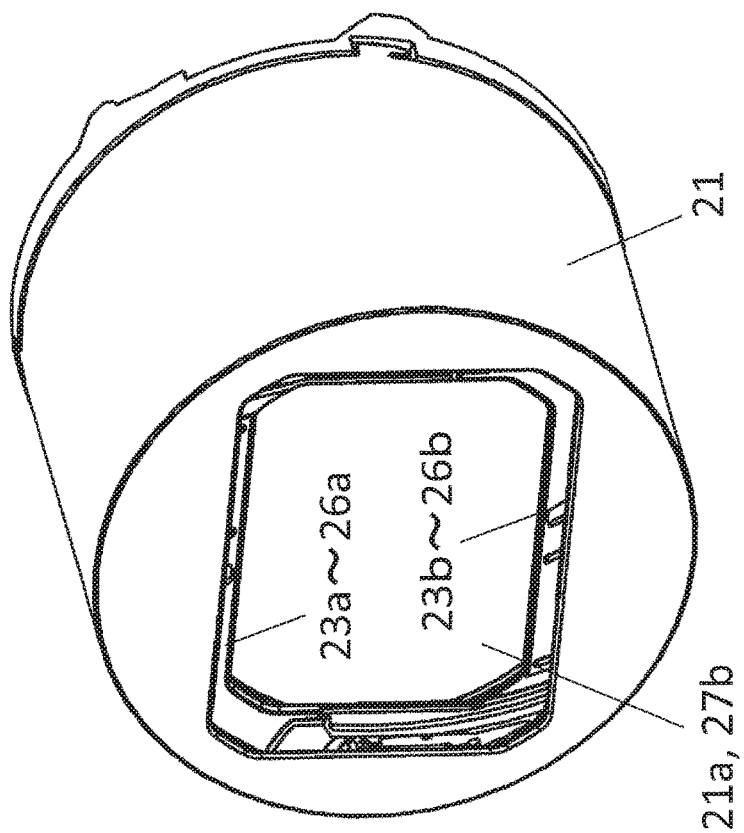
FIG. 3A is an oblique view of the state when the barrier vanes have been closed by the barrier mechanism of the lens barrel in FIG. 1.
Figure 3B:
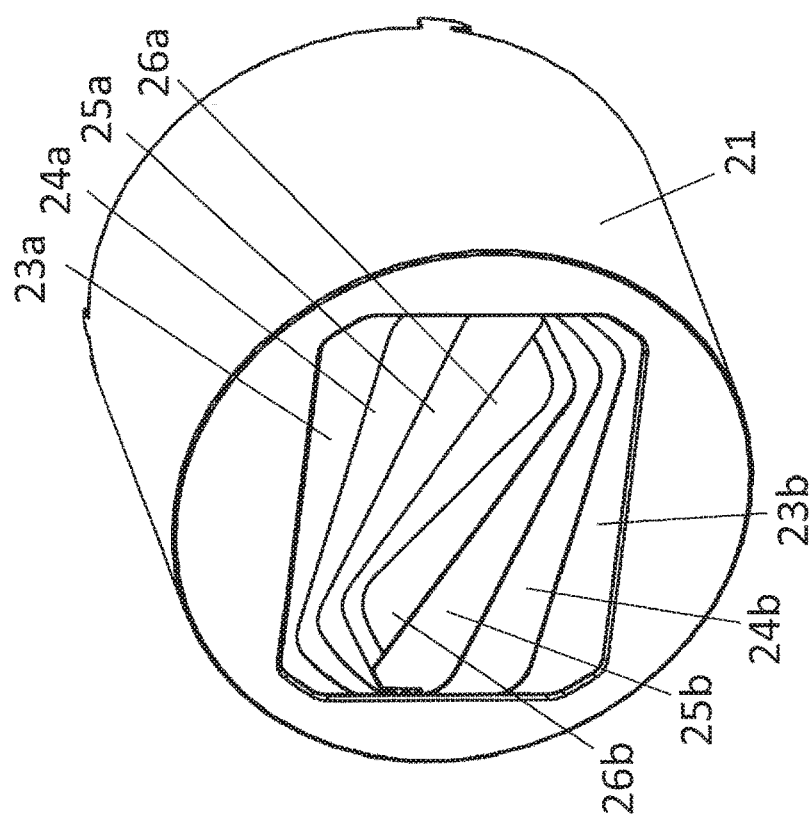
FIG. 3B is an oblique view of the state when the barrier vanes of the lens barrel in FIG. 1 have been opened.

In the collapsed state shown in FIG. 1, the barrier vanes 23a to 26a and 23b to 26b disposed in stacks of four each are rotated until they cover the opening 27b in a state in which only the ends of their faces overlap each other, as shown in FIG. 3A. On the other hand, in the imaging state shown in FIG. 2, the barrier vanes 23a to 26a and 23b to 26b are stowed in the outer peripheral portion of the opening 27b in a state in which the entire faces thereof are overlapping, as shown in FIG. 3B. Consequently, in the imaging state shown in FIG. 2, light entering through the openings 21a, 27b, etc., can be taken into the image sensor 36 side via the lenses L1 to L13.

With the lens barrel 10 in this embodiment, even with a large-aperture lens barrel in which the openings 21a, 27b, etc., are larger, the barrier vanes 23a to 26a and the barrier vanes 23b to 26b that cover half of the openings 21a and 27b are each divided into a plurality of vanes.

Consequently, the surface area taken up by the barrier vanes 23a to 26b at the end face of the first lens group frame 29 can be reduced, so it is possible to obtain a lens barrel 10 in which the aperture is made larger without increasing the overall size.

The detailed configuration and opening/closing mechanism of the barrier vanes 23a to 26b will be described in detail below.

Figure 4:
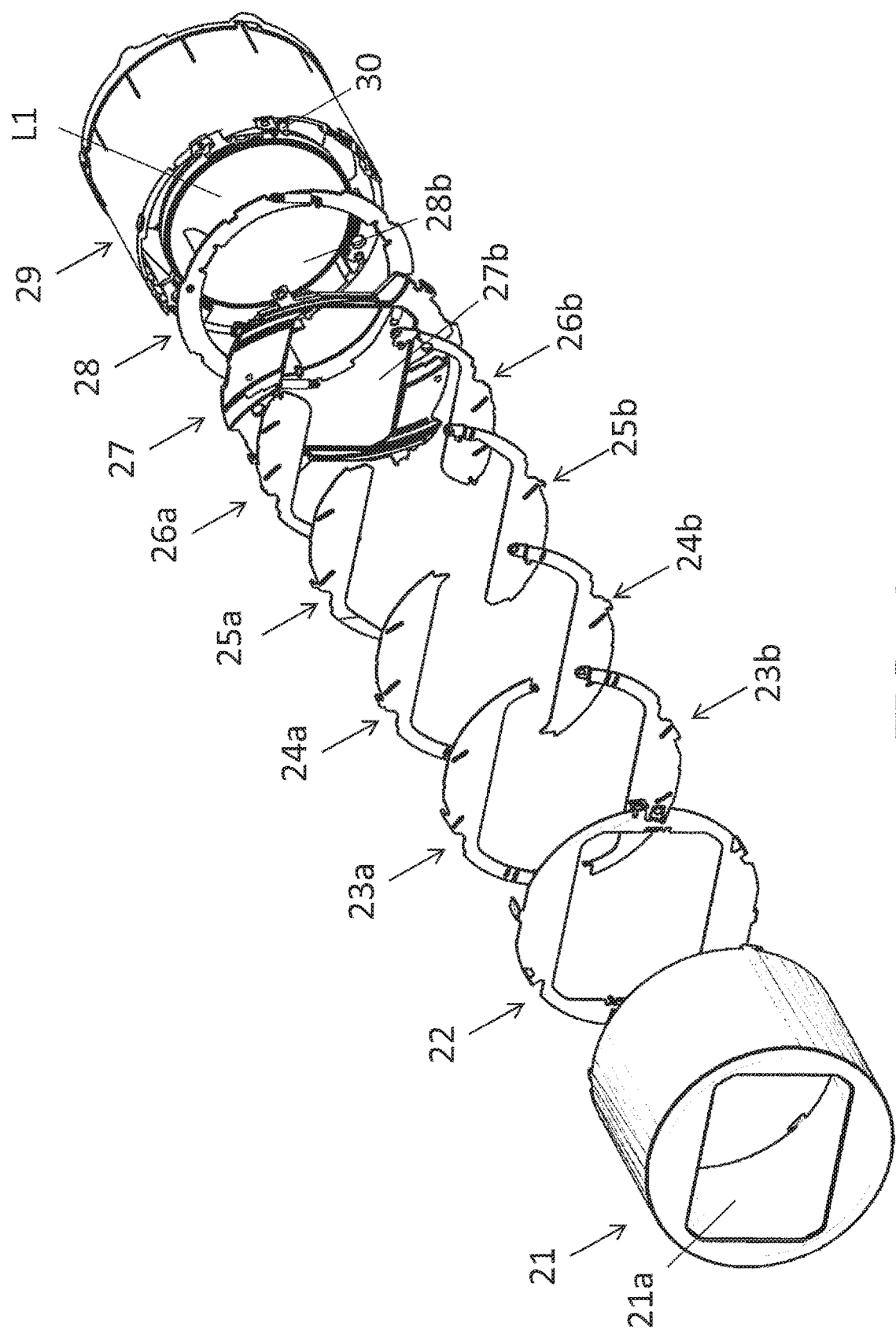
FIG. 4 is an exploded oblique view of the lens barrel in FIG. 1.

As shown in FIG. 4, the barrier sliding frame 28 is disposed between the end face on the subject side of the first lens group frame 29 and the stationary frame 27 in a state of being able to rotate with respect to the first lens group frame 29 and the stationary frame 27. The barrier sliding frame 28 rotates in a specific direction when switching between the imaging state and the collapsed state, thereby performing the opening and closing operations of the barrier vanes 23a to 26b (discussed below).

Figure 5:
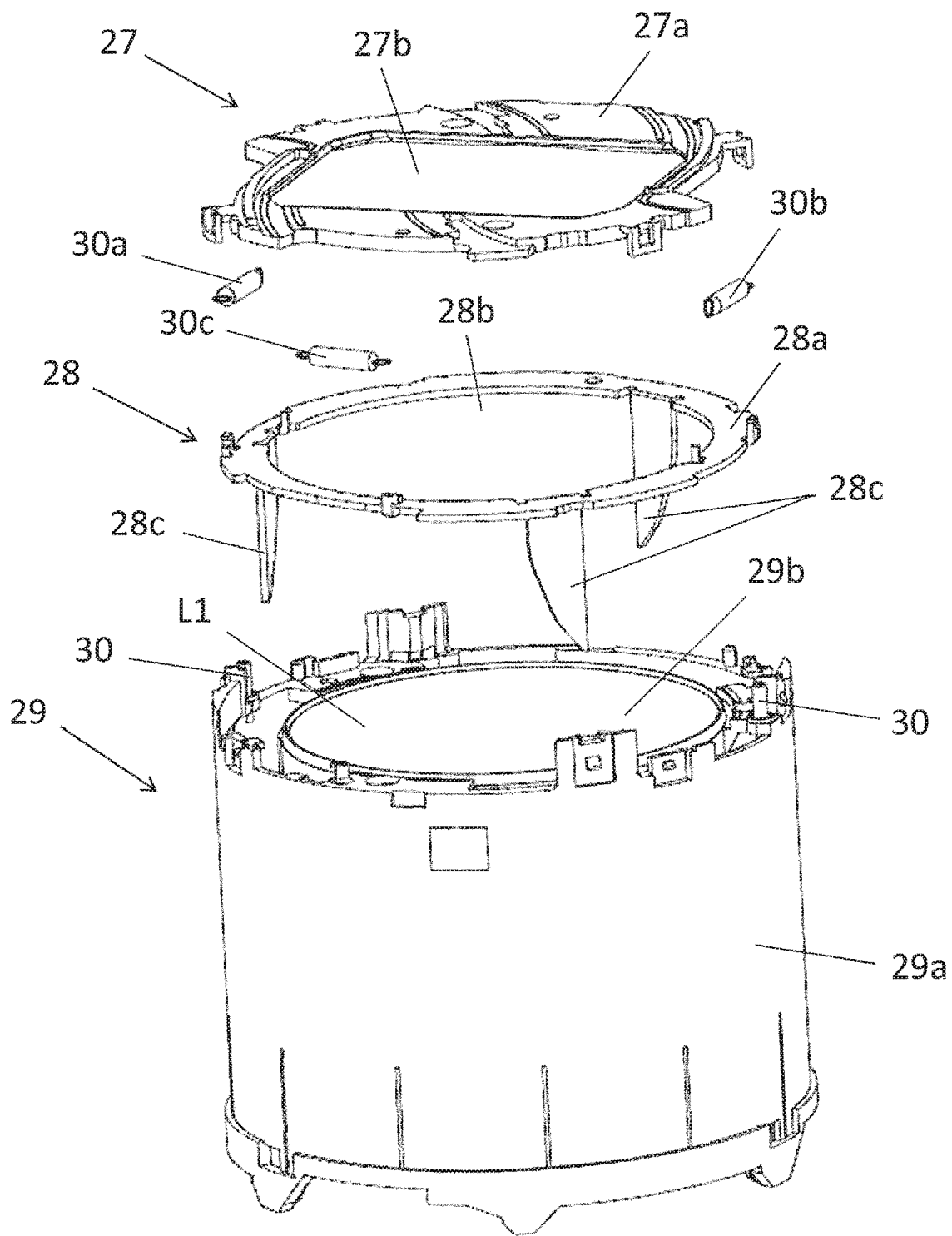
FIG. 5 is an oblique view of the configuration of the main portion of the lens barrel in FIG. 1.

Also, as shown in FIG. 5, the barrier sliding frame 28 has a substantially annular main body portion 28a, a substantially circular opening 28b, and contacted portions 28c.

The contacted portions 28c are provided so as to protrude toward the first lens group frame 29 side in the substantially annular main body portion 28a. In the collapsed state shown in FIG. 1, the contacted portions 28c are mated to a mating portions 32b. This allows the barrier sliding frame 28 to be rotated around the optical axis.

As shown in FIG. 4, the stationary frame 27 is disposed between the barrier sliding frame 28 and the barrier vanes 23a to 26b. As shown in FIG. 5, the stationary frame 27 has a substantially annular main body portion 27a and the substantially rectangular opening 27b.

The stationary frame 27 is fixed to the end face on the subject side of the first lens group frame 29. Therefore, even though the barrier sliding frame 28 rotates during switching between the imaging state and the collapsed state, the stationary frame 27 does not rotate. Consequently, the substantially rectangular opening 27b of the stationary frame 27 does not rotate relative to the first lens group frame 29 provided with the rotating shaft 30.

Furthermore, the stationary frame 27 is disposed so as to come into contact with the barrier vanes 26a and 26b disposed on the opposite side from the subject (the image sensor 36 side), among the plurality of barrier vanes 23a to 26b. This allows the stationary frame 27 to support the barrier vanes 26a and 26b from the image sensor 36 side.

Figure 7B:
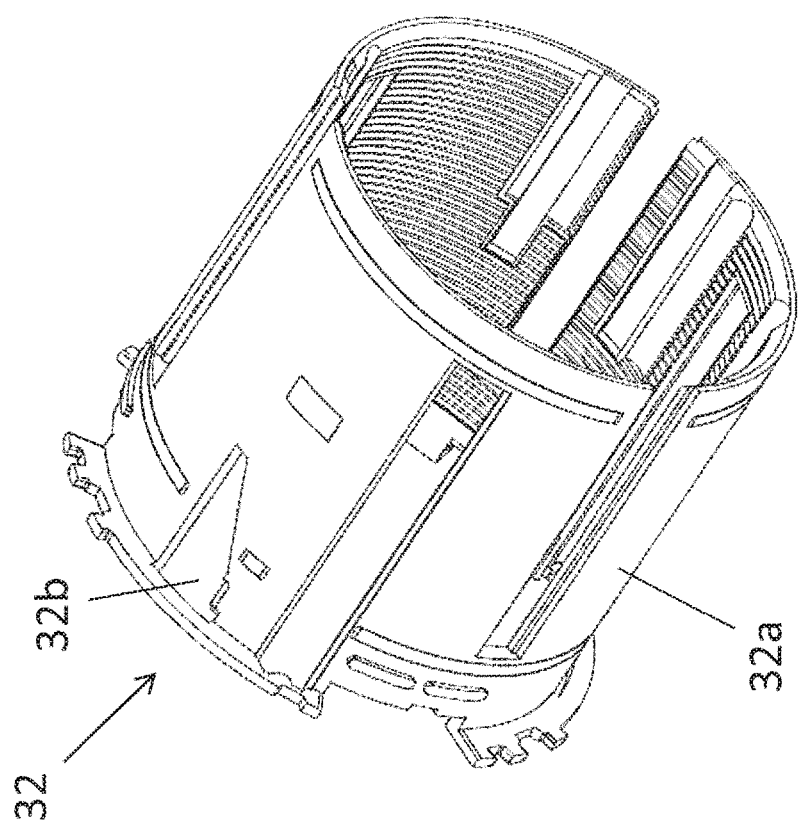
FIGS. 7A and 7B are oblique views of the configuration of a rectilinear frame.
Figure 7A:
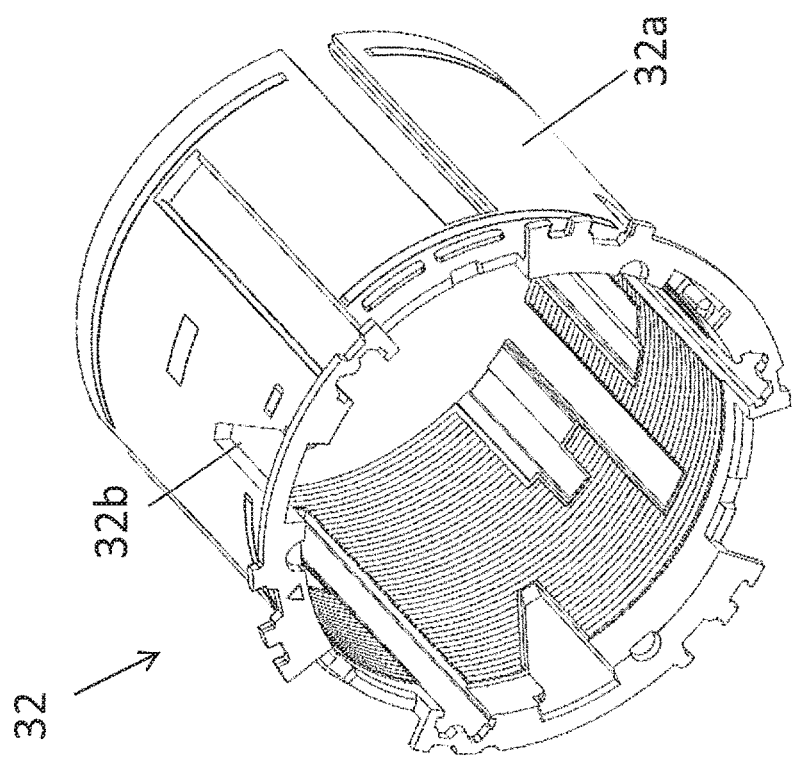

As shown in FIGS. 1 and 2, the rectilinear frame 32 moves back and forth in the optical axis direction on the inner peripheral face side of the double-sided cam frame 31, and in the collapsed state shown in FIG. 1, is disposed on the inner peripheral face side of the first lens group frame 29. As shown in FIGS. 7A and 7B, the rectilinear frame 32 includes a cylindrical main body portion 32a and the mating portions 32b that are formed as substantially triangular notches in the cylindrical main body portion 32a.

In the collapsed state shown in FIG. 1, the mating portions 32b are mated with the substantially triangular contacted portions 28c of the barrier sliding frame 28.

The mechanism for opening and closing the barrier vanes 23a to 26b by mating the contacted portions 28c of the barrier sliding frame 28 with the mating portions 32b of the rectilinear frame 32 in the collapsed state will be described in detail below.

Configuration of Barrier Vanes 23a to 26b

Figure 6A:
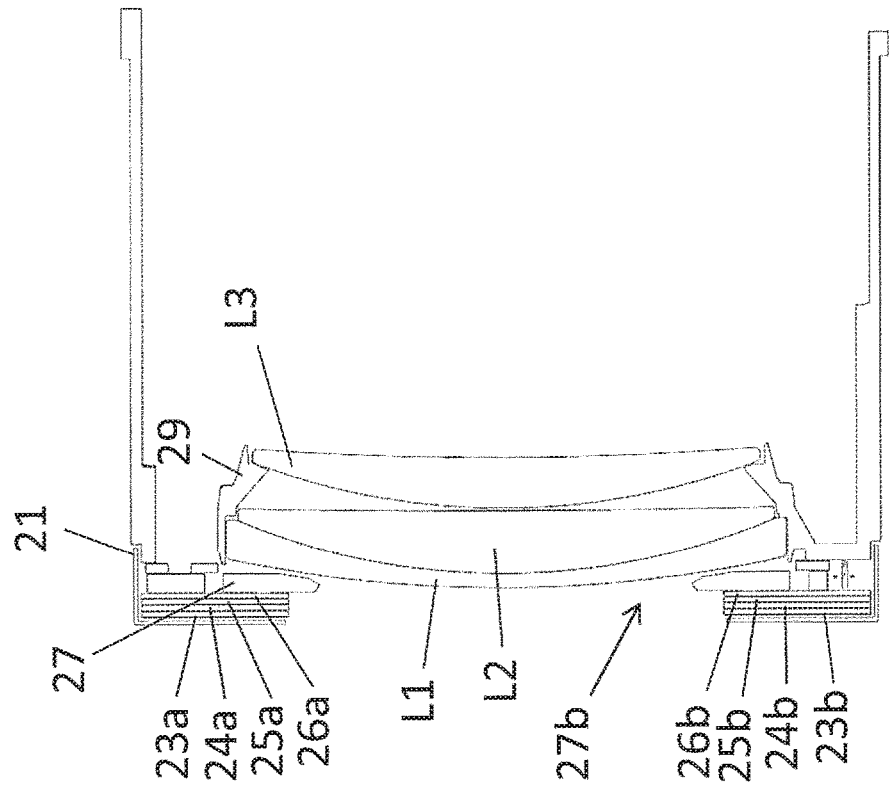
FIG. 6A is a cross section of the state when the barrier vanes have been closed by the barrier mechanism of the lens barrel in FIG. 1.
Figure 6B:
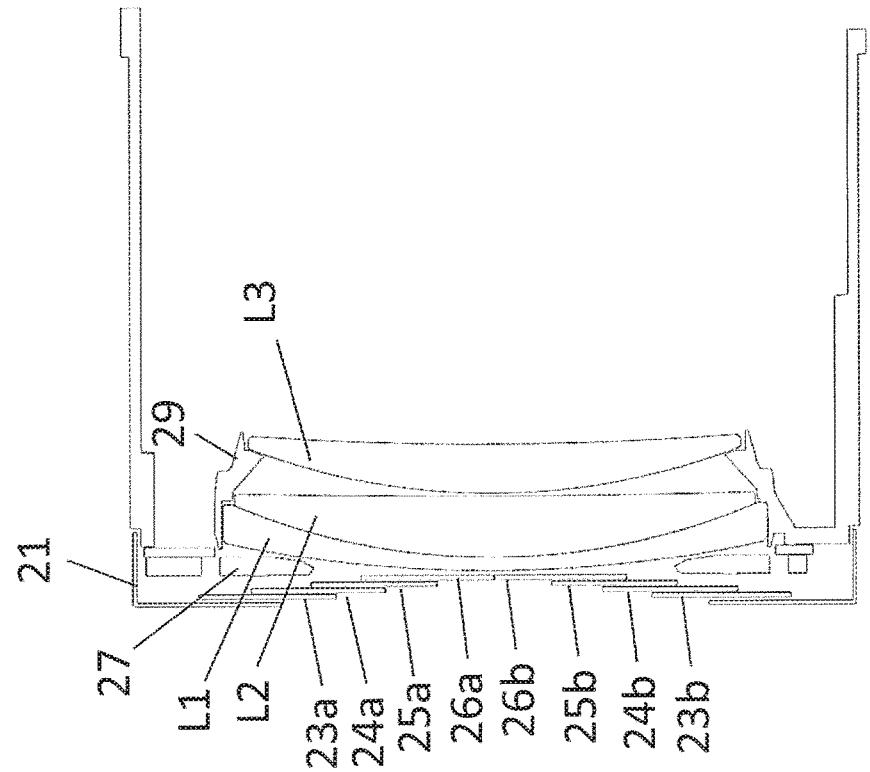
FIG. 6B is a cross section of the state when the barrier vanes of the lens barrel in FIG. 1 have been opened.

With the lens barrel 10 in this embodiment, in order to switch between the closed state shown in FIG. 6A and the open state shown in FIG. 6B, the barrier vanes 23a to 26b are driven open and closed.

The opening and closing operation in which the opening 27b, etc., is opened or closed is performed by rotating the barrier vanes 23a to 26a and the barrier vanes 23b to 26b around the two rotating shafts 30 disposed at separated positions on the subject side end face of the first lens group frame 29. All of the barrier vanes 23a to 26b are formed as substantially flat plate-shaped members made of metal.

This allows the size in the optical axis direction to be reduced as compared with a conventional configuration including barrier vanes, in which disposed a plurality of barrier vanes are disposed overlapping and are formed as a plate-shaped members having a step.

The configuration of the barrier vanes 23a to 26b to be opened and closed will be described below.

Figure 8B:
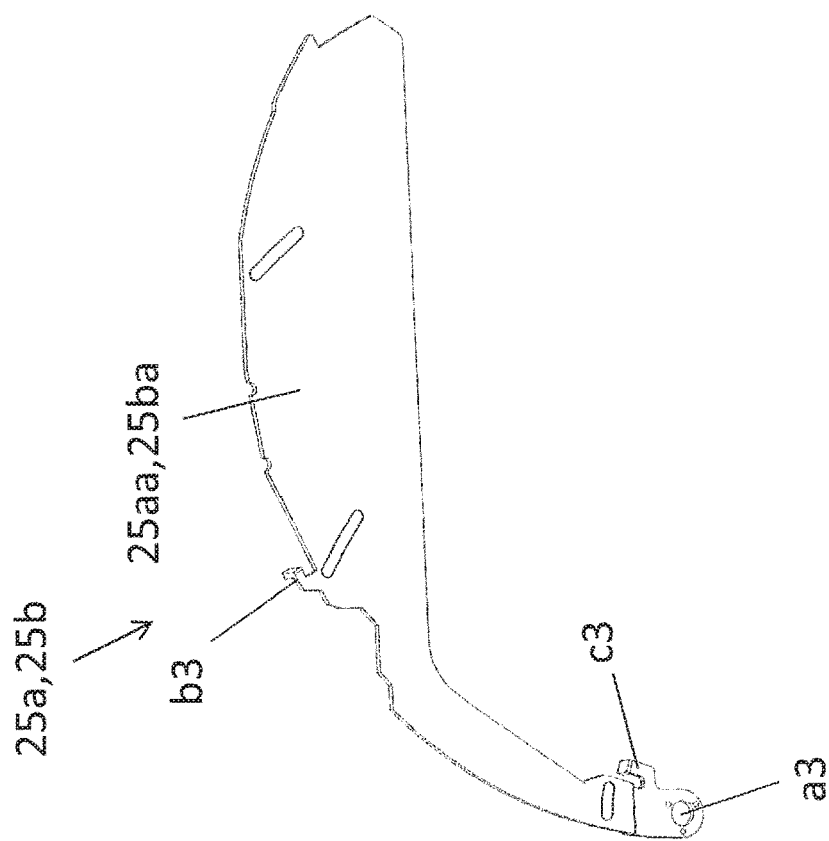
FIG. 8B is an oblique view of the barrier vane disposed adjacent to the barrier vane on the outside in the radial direction in the closed state in FIG. 8A.
Figure 8A:
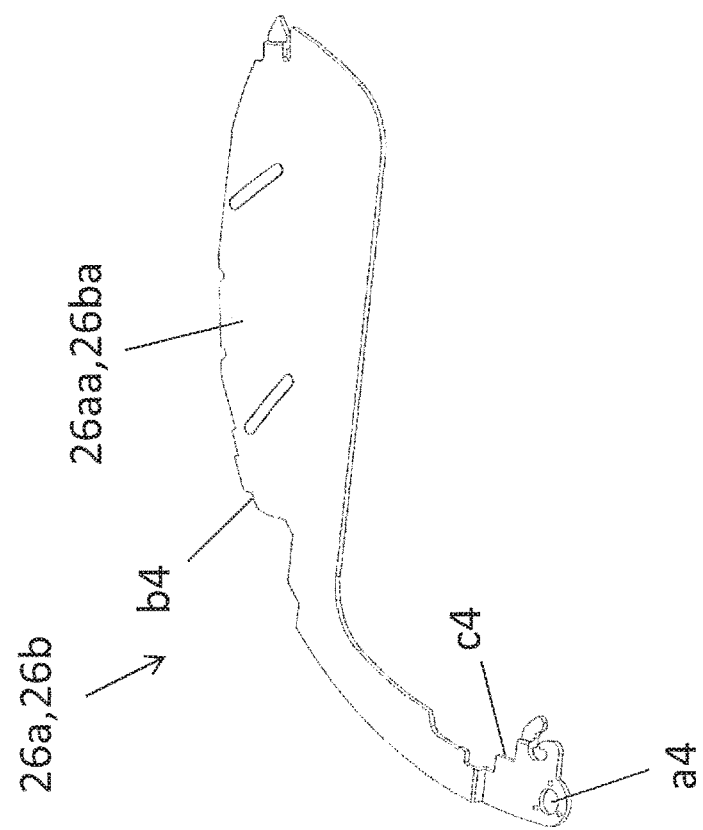
FIG. 8A is an oblique view of the barrier vane disposed closest to the inside in the radial direction in a closed state, among the plurality of barrier vanes.

The barrier vanes 26a and 26b are feather-shaped members disposed on the innermost side in the radial direction (toward the center) in the closed state shown in FIG. 6A, and as shown in FIG. 8A, have a plate-shaped portion (flat portion) 26aa or 26ba and a side face portion (thickness portion) formed of a plane intersecting the plate-shaped portion.

As shown in FIG. 8A, the plate-shaped portions 26aa and 26ba each have a shaft hole a4, a latching component (second latching component) b4, and a latching component (first latching component) c4.

The shaft hole a4 is a through-hole formed in the base portion of each of the barrier vanes 26a and 26b, and the rotating shafts 30 provided to the end face of the first lens group frame 29 are inserted into these holes.

During the opening operation of the barrier vanes 23a to 26b, the latching components b4 make contact with a part (the latching components b3) of the adjacent barrier vanes 25a and 25b, and the barrier vanes 25a and 25b are pulled along with this and rotated. The latching components b4 are disposed so as to protrude substantially in the optical axis direction near the side faces of the barrier vanes 26a and 26b that are away from the optical axis of the lens L1. Furthermore, the latching components b4 are disposed at positions away from the shaft holes a4 (the rotating shafts 30) of the barrier vanes 26a and 26b.

The latching components c4 are disposed near the shaft holes a4 and make contact with a part of the adjacent barrier vanes 25a and 25b during the closing operation of the barrier vanes 23a to 26b, and the barrier vanes 25a and 25b are pulled along with this and rotated. The latching portions c4 are disposed so as to protrude substantially in the optical axis direction near the side faces of the barrier vanes 26a and 26b that are near the optical axis of the lens L1.

In the closed state shown in FIG. 6A, the barrier vanes 25a and 25b are feather-shaped members disposed on the outermost sides in the radial direction of the barrier vanes 26a and 26b disposed on the innermost side in the radial direction (closer to the center), and as shown in FIG. 8B, have a plate-shaped portion (flat portion) 25aa or 25ba and a side face portion (thickness portions) formed of a plane intersecting the plate-shaped portion.

As shown in FIG. 8B, the plate-shaped portions 25aa and 25ba each have a shaft hole a3, a latching component (second latching component) b3, and a latching component (first latching component) c3.

The shaft holes a3 are through-holes formed in the base portions of the barrier vanes 25a and 25b, and the rotating shafts 30 provided to the end faces of the first lens group frame 29 are inserted into these holes.

At the time of opening the barrier vanes 23a to 26b, the latching components b3 come into contact with part (the latching components b4) of the adjacent barrier vanes 26a and 26b and rotate to a specific open position together with the barrier vanes 26a and 26b. Also, the latching components b3 are disposed so as to protrude substantially in the optical axis direction near the side faces of the barrier vanes 25a and 25b that are away from the optical axis of the lens L1. Furthermore, the latching components b3 are disposed at positions that are away from the shaft holes a3 (the rotating shafts 30) of the barrier vanes 25a and 25b.

The latching components c3 are disposed near the shaft holes a3 and make contact with part of the adjacent barrier vanes 26a and 26b during the closing operation of the barrier vanes 23a to 26b, and rotate to a specific closed position together with the barrier vanes 26a and 26b. The latching portions c3 are disposed so as to protrude substantially in the optical axis direction near the side faces of the barrier vanes 25a and 25b near the optical axis of the lens L1.

Figure 9B:
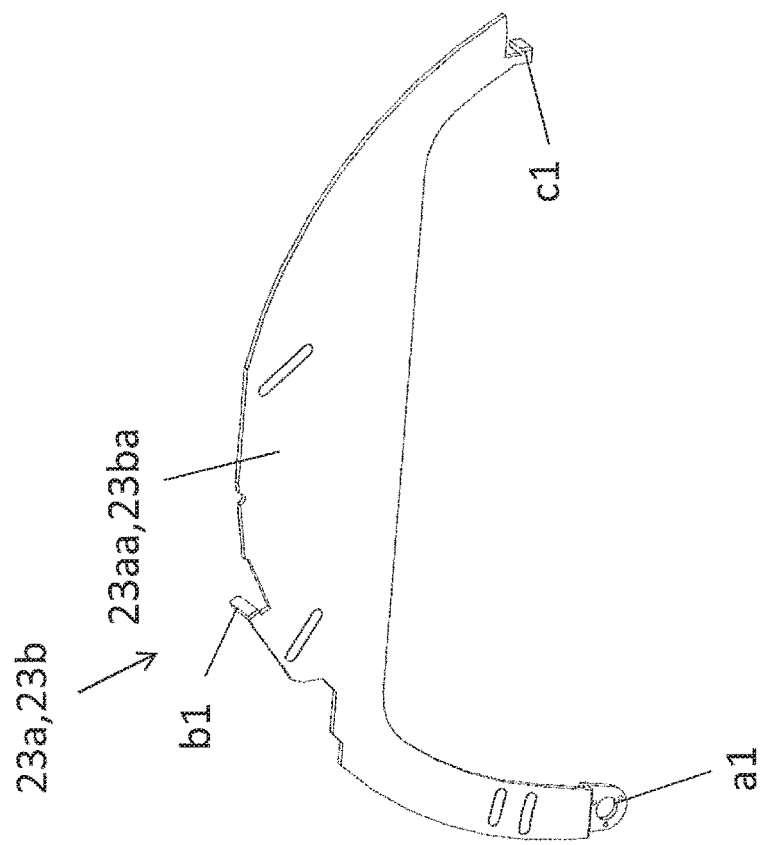
FIG. 9B is an oblique view of the barrier vanes disposed furthest on the outside in the radial direction among the plurality of barrier vanes, in a closed state.
Figure 9A:
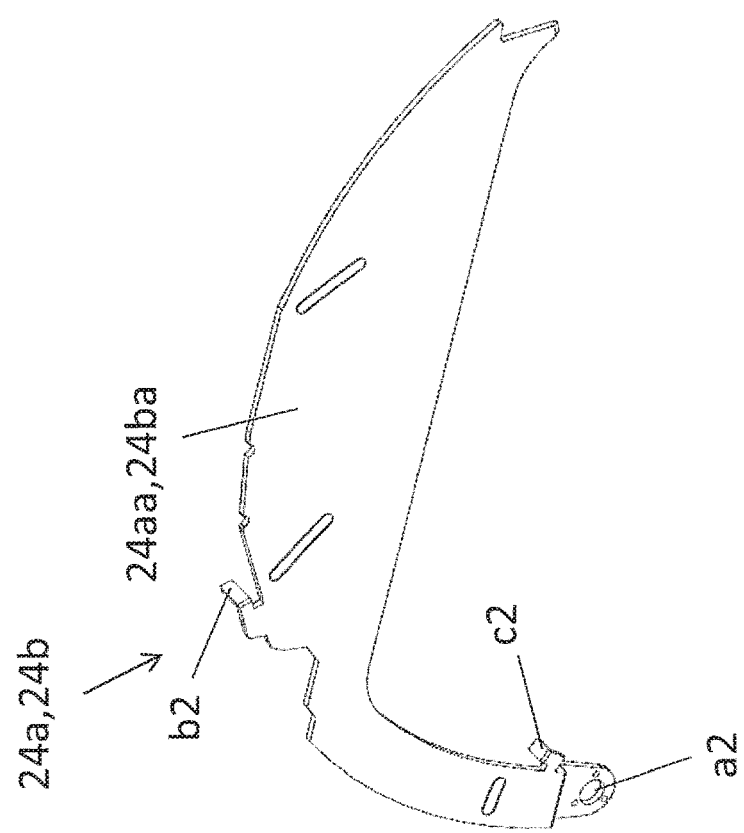
FIG. 9A is an oblique view of the barrier vane disposed adjacent to the barrier vane in FIG. 8B on the outside in the radial direction.

In the closed state shown in FIG. 6A, the barrier vanes 24a and 24b are feather-shaped members disposed on the outer radial side of the barrier vanes 25a and 25b, and as shown in FIG. 9A, each have a plate-shaped portion (flat portion) 24aa or 24ba and a side face portion (thickness portion) formed of a plane intersecting the plate-shaped portion.

As shown in FIG. 9A, the plate-shaped portions 24aa and 24ba each have a shaft hole a2, a latching component (second latching component) b2, and a latching component (first latching component) c2.

The shaft holes a2 are through-hole formed in the base portions of the barrier vanes 24a and 24b, and the rotating shafts 30 provided to the end face of the first lens group frame 29 are inserted into these holes.

During the opening of the barrier vanes 23a to 26b, the latching components b2 make contact with part of the adjacent barrier vanes 25a and 25b and rotate to specific open positions together with the barrier vanes 25a and 25b. Also, the latching components b2 are disposed so as to protrude substantially in the optical axis direction near the side faces of the barrier vanes 24a and 24b that are away from the optical axis of the lens L1. Furthermore, the latching components b2 are disposed at positions that are away from the shaft holes a2 (the rotating shafts 30) of the barrier vanes 24a and 24b.

The latching components c2 are disposed near the shaft holes a2 and come into contact with part of the adjacent barrier vanes 25a and 25b during the closing operation of the barrier vanes 23a to 26b, and rotate to specific positions together with the barrier vanes 25a and 25b. The latching portions c2 are disposed so as to protrude substantially in the optical axis direction near the side faces of the barrier vanes 24a and 24b on the side closer to the optical axis of the lens L1.

In the closed state shown in FIG. 6A, the barrier vanes 23a and 23b are feather-shaped members disposed on the outermost radial side, and as shown in FIG. 9B, have a plate-shaped portion (flat portion) 23aa or 23ba and a side face portion (thickness portion) formed of a plane intersecting with the plate-shaped portion.

As shown in FIG. 9B, the plate-shaped portions 23aa and 23ba each have a shaft hole a1, a latching component (second latching component) b1, and a latching component (first latching component) c1.

The shaft holes a1 are through-holes formed in the base portions of the barrier vanes 23a and 23b, and the rotating shafts 30 provided to the end faces of the first lens group frame 29 are inserted into these holes.

During the opening operation of the barrier vanes 23a to 26b, the latching components b1 come into contact with part of the adjacent barrier vanes 24a and 24b and rotate to specific open positions together with the barrier vanes 24a and 24b. The latching components b1 are disposed so as to protrude substantially in the optical axis direction near the side faces of the barrier vanes 23a and 23b that are away from the optical axis of the lens L1. Furthermore, the latching component b1 are disposed at positions away from the shaft holes a1 (the rotating shafts 30) of the barrier vanes 23a and 23b.

The latching components c1 are disposed near the distal end on the opposite side from the shaft holes a1, make contact with part (the latching components c2) of the adjacent barrier vanes 24a and 24b during the closing operation of the barrier vanes 23a to 26b, and rotate to specific closed positions together with the barrier vanes 24a and 24b. The latching portions c1 are disposed so as to protrude substantially in the optical axis direction near the side faces of the barrier vanes 23a and 23b near the optical axis of the lens L1.

With the lens barrel 10 in this embodiment, as described above, the four barrier vanes 23a to 26a on the first barrier vane group side and the four barrier vanes 23b to 26b on the second barrier vane group side are paired together, and the barrier vanes 23a to 26a and the barrier vanes 23b to 26b are disposed overlapping each other in stacks of four. During the opening and closing of the barrier vanes 23a to 26a and 23b to 26b, the adjacent barrier vanes 23a to 26a and 23b to 26b are rotated around the rotary shafts 30 while part of them are in contact with each other, and this performs the opening and closing operations.

Opening Operation of Barrier Vanes 23a to 26b

With the lens barrel 10 in this embodiment, as described above, the four barrier vanes 23a to 26a and the four barrier vanes 23b to 26b are disposed in point symmetry around the optical axis and are opened and closed, the result being that in the collapsed state shown in FIG. 1, they protect the surface of the lens L1 disposed closest to the subject side.

The operation of opening the barrier vanes 23a to 26b when changing from the collapsed state to the imaging state will now be described in specific terms.

Figure 10B:
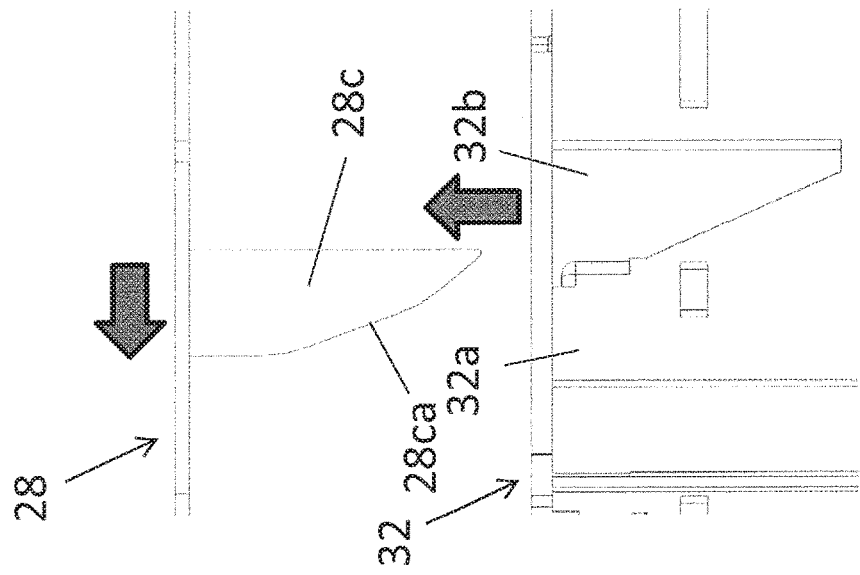
FIG. 10B is a detail view of a state in which the rectilinear frame and the barrier sliding frame have moved apart in the imaging state (open state)
Figure 10A:
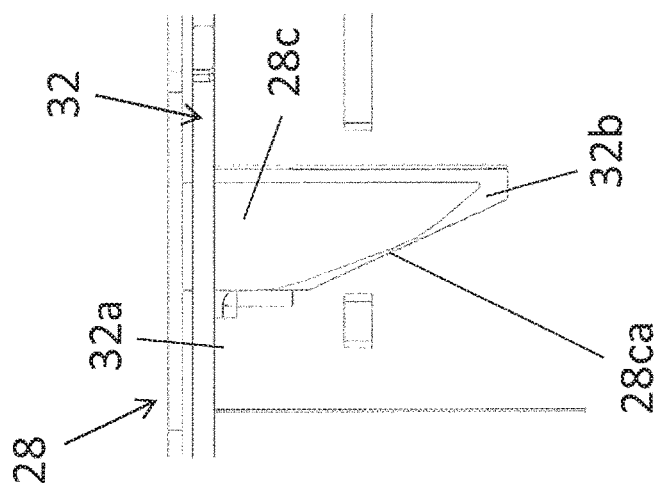
FIG. 10A is a detail view of the transition from a state in which contacted portions of the barrier sliding frame are mated to mating portions of the rectilinear frame in a collapsed state (closed state), to an imaging state (open state)

In the collapsed state shown in FIG. 1, since the rectilinear frame 32 and the barrier sliding frame 28 are located close to each other, the contacted portions 28c of the barrier sliding frame 28 have moved into the mating portions 32b of the rectilinear frame 32 as shown in FIG. 10A.

In the transition to the imaging state shown in FIG. 2, the barrier sliding frame 28 moves to the subject side in the optical axis direction with respect to the rectilinear frame 32 as shown in FIG. 10B.

Figure 11:
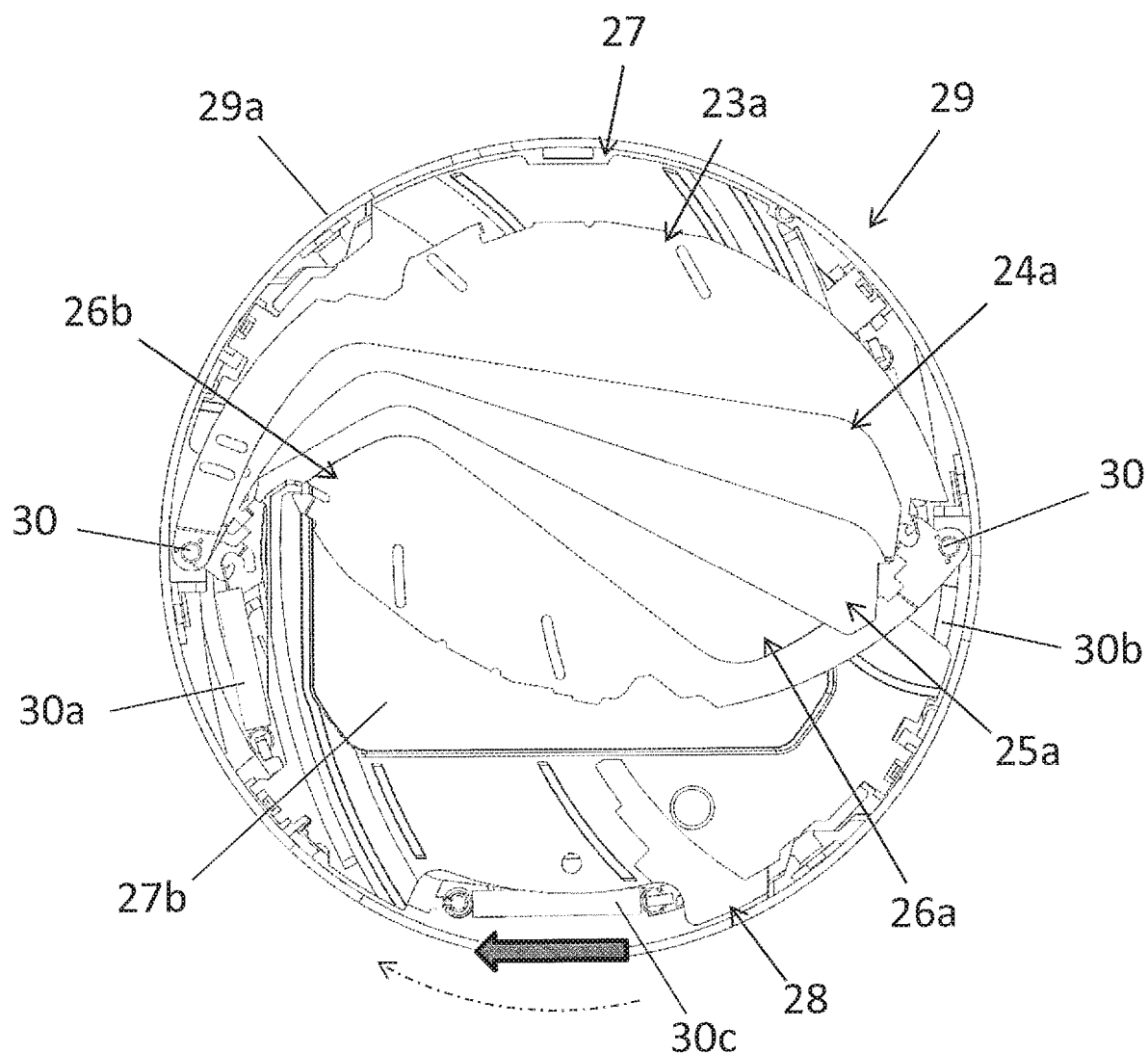
FIG. 11 is an oblique view of how the barrier sliding frame rotates as a result of the transition to a state in which the barrier sliding frame and the rectilinear frame have moved apart as shown in FIG. 10B (a state in which the contacted portions of the barrier sliding frame are separated from the mating portions of the rectilinear frame)

At this point, as shown in FIG. 11, the barrier sliding frame 28 is rotated in the circumferential direction (clockwise) around the optical axis by the biasing force of a spring 30c disposed at the end face of the first lens group frame 29 on the subject side of the cylindrical first lens group frame 29.

The ends of the spring 30c are connected to the end face of the first lens group frame 29 and part of the barrier sliding frame 28, and bias in the clockwise direction the barrier sliding frame, which is provided so as to be rotatable with respect to the first lens group frame 29.

The biasing force of the spring 30c that biases the barrier sliding frame 28 in the rotational direction is greater than the biasing force of the springs 30a and 30b that bias the barrier vanes 23a to 26a and the barrier vanes 23b to 26b.

In the collapsed state shown in FIG. 1, the spring 30c is in a state in which the contacted portions 28c of the barrier sliding frame 28 are matted with the mating portions 32b of the rectilinear frame 32, so that the spring 30c is in an extended state. Therefore, during transition to the imaging state shown in FIG. 2, when the mated state of the mating portions 32b of the rectilinear frame 32 and the contacted portions 28c of the barrier sliding frame 28 is released, the biasing force of the spring 30c causes the barrier sliding frame 28 to rotate clockwise as shown in FIG. 11.

In the closed state shown in FIG. 11, the barrier vanes 23a to 26b are disposed such that part of the adjacent vane members overlap each other along the optical axis direction, entirely covering the substantially rectangular opening 27b.

Although the barrier vanes 23b to 26b are not depicted in FIG. 11, the layout on the side of the barrier vanes 23b to 26b is the same.

Figures 12A, 12B:
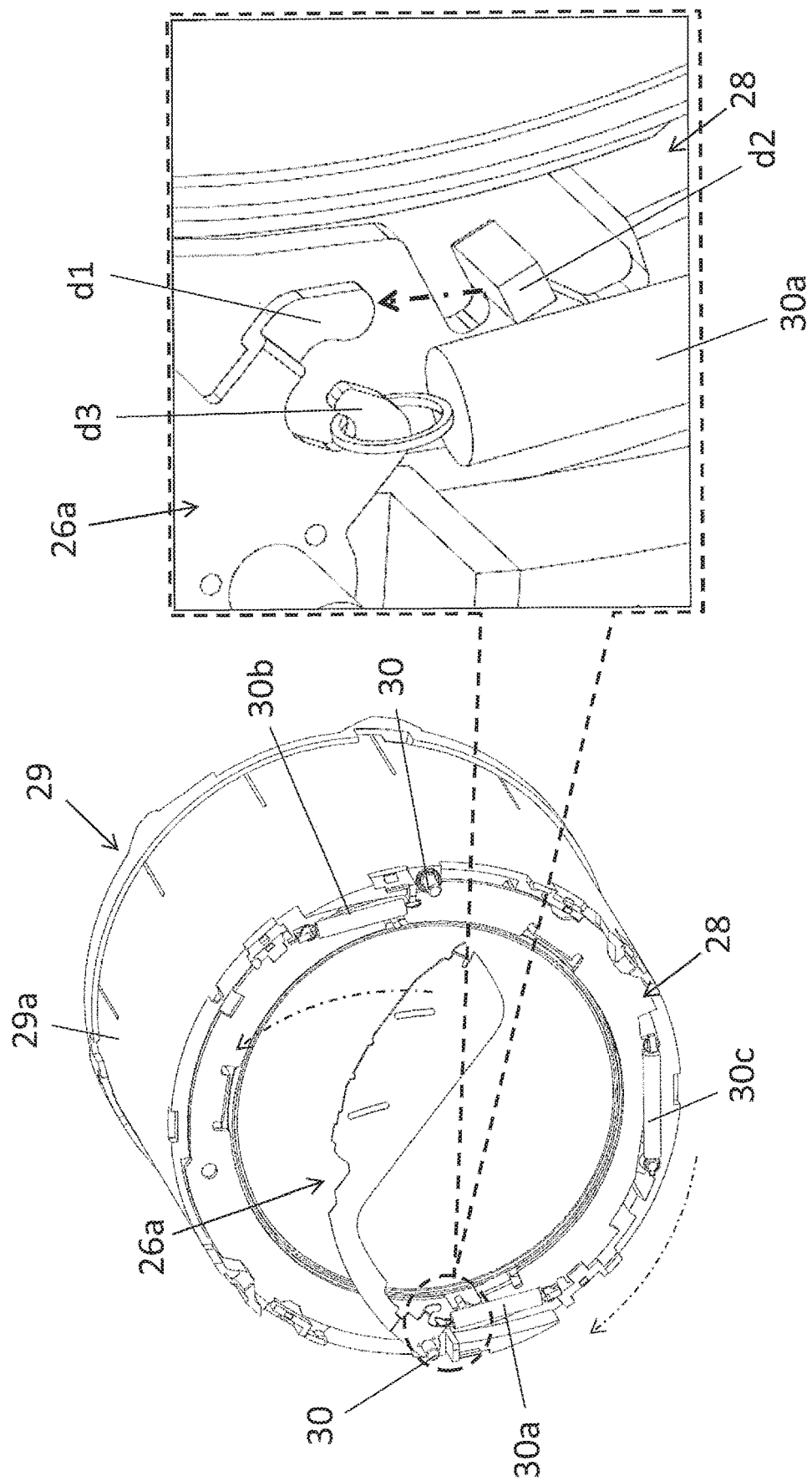
FIG. 12A is a diagram of the transition to the open state (imaging state) of the barrier vanes in FIG. 10B.
FIG. 12B is a detail view of FIG. 12A.

When the barrier sliding frame 28 then rotates in the clockwise direction under the biasing force of the spring 30c, the barrier vane 26a, which is held in its closed state by the biasing force of the spring 30a, transitions to its open state, as shown in FIG. 12A.

In FIG. 12A, to make the illustration more clear, only the barrier vane 26a on the innermost radial side, which is directly driven by the rotation of the barrier sliding frame 28, is shown, but the other barrier vane 26b likewise is driven from a state in which it is subjected to the biasing force of the spring 30b.

That is, as the barrier sliding frame 28 rotates clockwise from a state in which the barrier vane 26a is held in a specific closed state position by the biasing force of the spring 30a, as shown in FIG. 12B, part of the barrier vane 26a (the contact portion d1) hits part of the barrier sliding frame 28 and is lifted up. As a result, among the four barrier vanes 23a to 26a, the barrier vane 26a disposed closest on the innermost radial side in the closed state can be rotated to the outer peripheral side (open state) around the rotating shaft 30.

Figure 13:
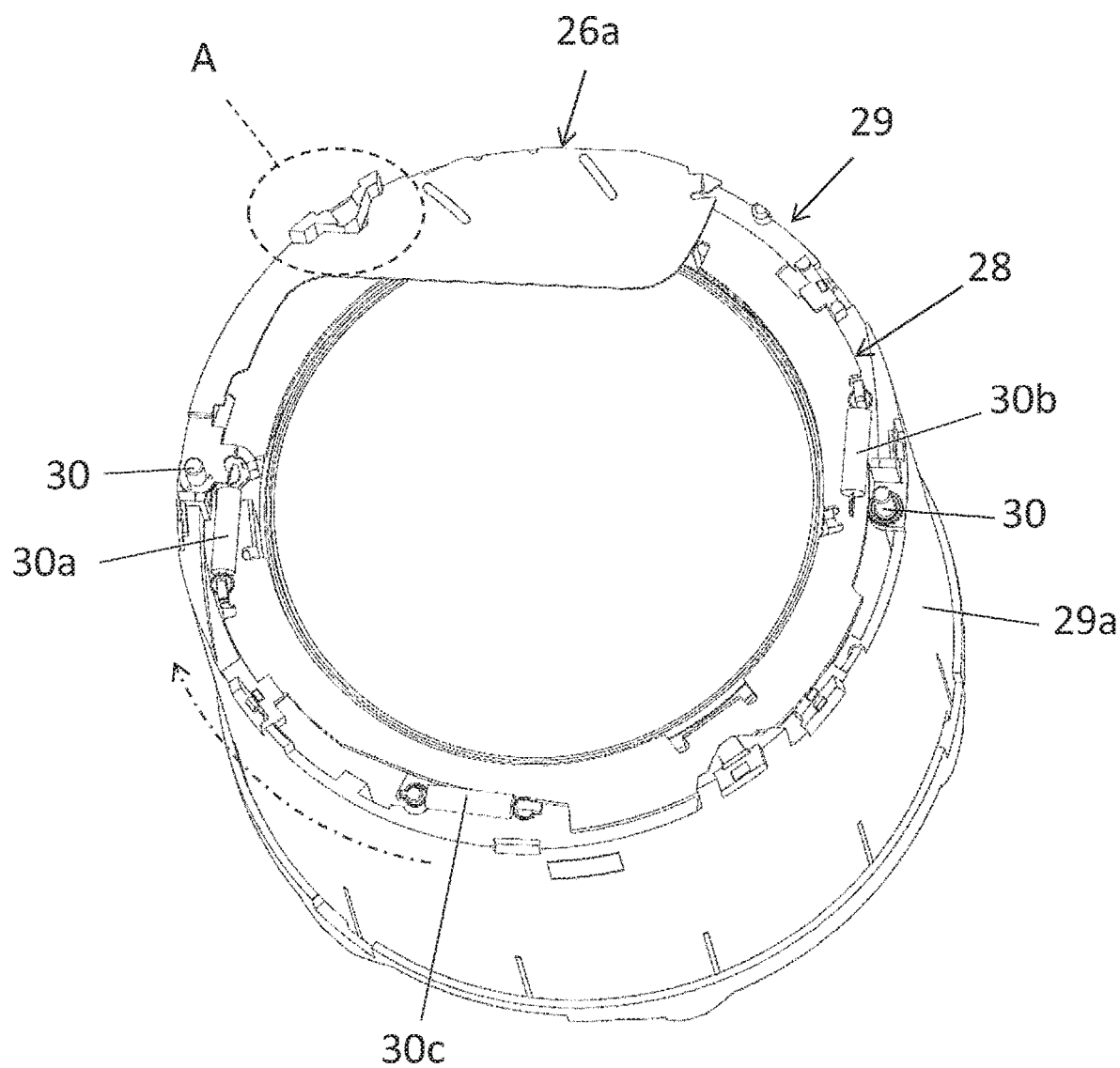
FIG. 13 is an oblique view of a state in which the barrier vane disposed furthest to the inside in the radial direction has transitioned to a closed state at the time of the transition to the open state (imaging state) in FIG. 12A.

As shown in FIG. 13, the barrier vane 26a is rotated by the clockwise rotation of the barrier sliding frame 28, hits the portion A projecting in the optical axis direction from the end face of the first lens group frame 29, and is held in place.

Figure 14A:
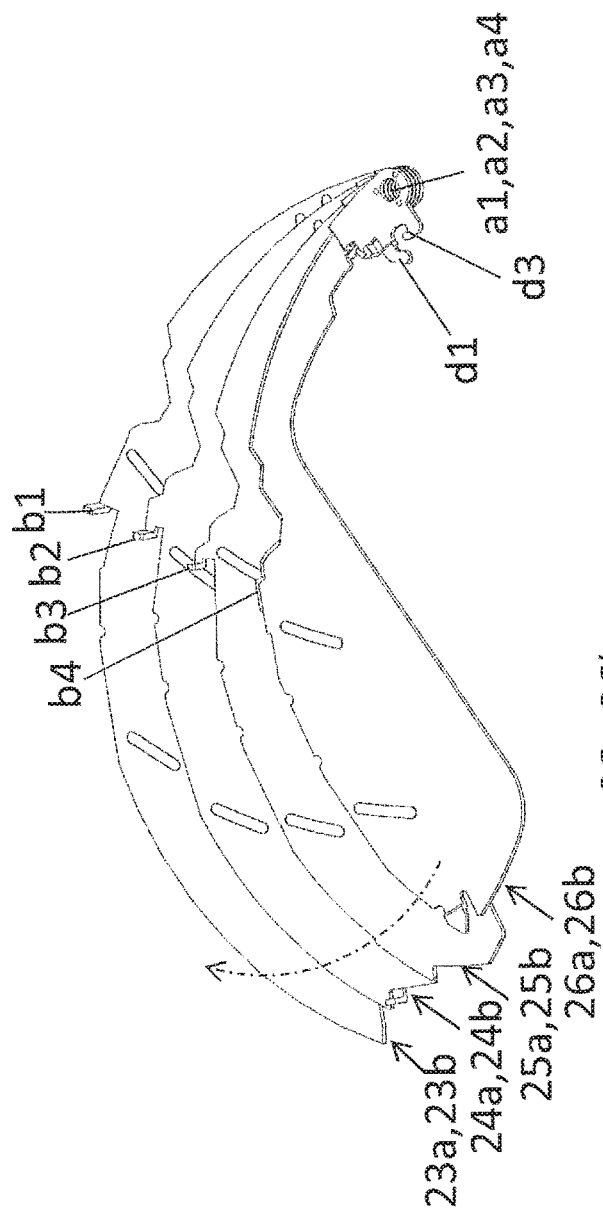
FIG. 14A is an oblique view of the flow when the plurality of barrier vanes move from a closed state to an open state.

At this point, as shown in FIG. 14A, as the barrier vane 26a disposed on the innermost radial side rotates, the barrier vanes 23a to 25a disposed overlapping the barrier vane 26a rotate in the same manner and in the same direction around the shaft 30, resulting in a transition from a closed state to an open state.

More specifically, when the barrier vane 26a is rotated from the closed state shown in FIG. 14A in the direction of the one-dot chain line in the drawing, the end (the latching component b4) of the barrier vane 26a catches on the latching component b3 of the adjacent barrier vane 25a, the latching component b2 of the barrier vane 24a located to the inside thereof, and the latching component b1 of the barrier vane 23a located further to the inside, and they all rotate together. Consequently, the three adjacent barrier vanes 23a, 24a, and 25a can also be rotated in the same direction by the rotation of the barrier vane 26a.

Figure 14B:
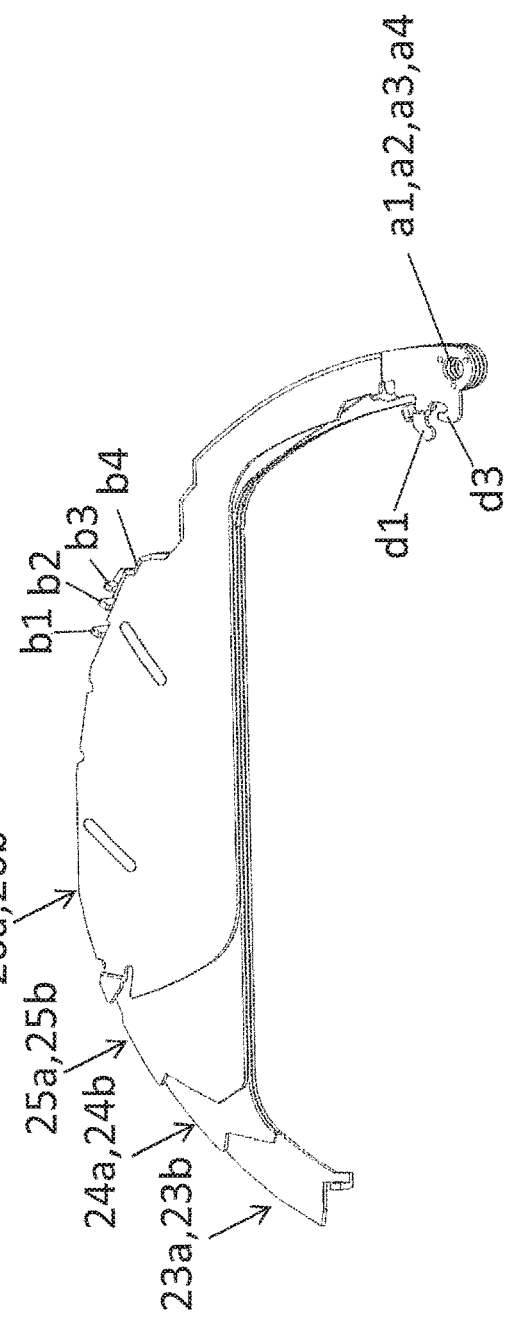
FIG. 14B is an oblique view of a state in which the plurality of barrier vanes have moved to a closed state.

As a result, the four barrier vanes 23a to 26a are substantially in a state of entirely overlapping as shown in FIG. 14B, and the opening 27b can be put in an open state by retracting these vanes to the outer peripheral portion of the first lens group frame 29.

The barrier vanes 23b to 26b rotate in the same manner, and the closed state can be changed to the open state by retracting these vanes to the outer peripheral portion of the first lens group frame 29.

Closing Operation of Barrier Vanes 23a to 26b

The operation of closing the barrier vanes 23a to 26b when changing from the imaging state shown in FIG. 2 to the collapsed state shown in FIG. 1 will now be described in specific terms.

In the imaging state shown in FIG. 2, since the rectilinear frame 32 and the barrier sliding frame 28 are located at positions separated in the optical axis direction, the contacted portions 28c of the barrier sliding frame 28 have come out of the mating portions 32b of the rectilinear frame 32, as shown in FIG. 15A.

At this point, since the barrier sliding frame 28 is not in contact with the rectilinear frame 32, it is biased in the clockwise direction by the spring 30c.

In the transition to the collapsed state shown in FIG. 1, the barrier sliding frame 28 moves to a position near the rectilinear frame 32 in the optical axis direction, as shown in FIG. 15B.

Figure 16:
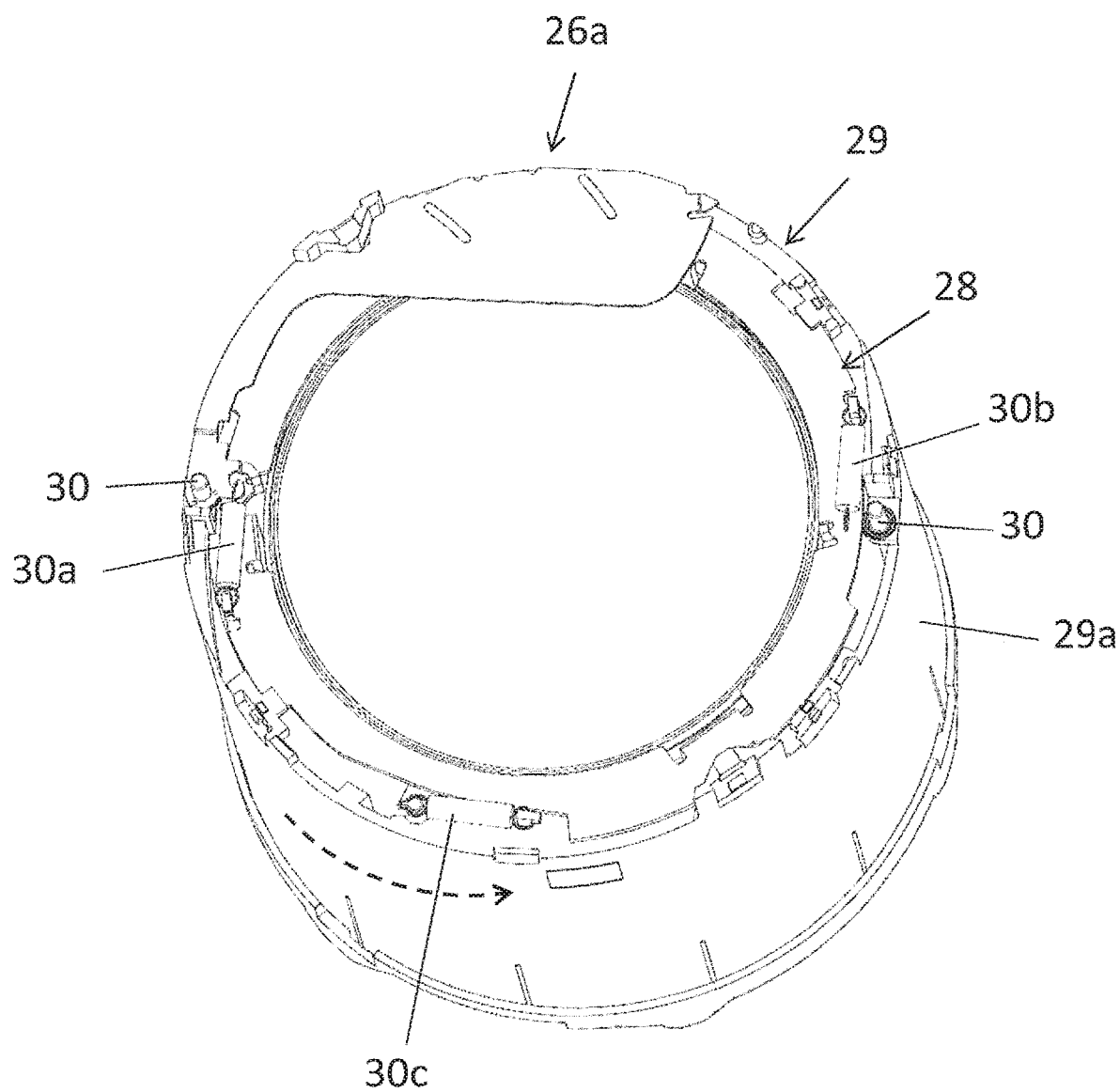
FIG. 16 is an oblique view of how the barrier sliding frame rotates when there is a transition to the state in which the contacted portions of the barrier sliding frame are mated to the mating portions of the rectilinear frame as shown in FIG. 15B.

At this point, as shown in FIG. 15B, the barrier sliding frame 28 is in a state in which the contacted portions 28c have entered the mating portions 32b of the rectilinear frame 32, and as shown by the broken line arrow in FIG. 16, rotates in the circumferential direction (counterclockwise) around the optical axis.

When the contacted portions 28c move in the optical axis direction and are inserted into the mating portions 32b of the rectilinear frame 32, the contacted portions 28c are inserted along tapered portions 28ca, which allows the barrier sliding frame 28 to be rotated counterclockwise around the optical axis.

When the barrier sliding frame 28 rotates in the counterclockwise direction, the contact component d2 of the barrier sliding frame 28, on which the contacted portion d1 of the barrier vane 26a in FIG. 12B has been lifted up, returns to its retracted position, so the barrier vane 26a is biased toward its open state by the biasing force of the spring 30a.

Figure 17:
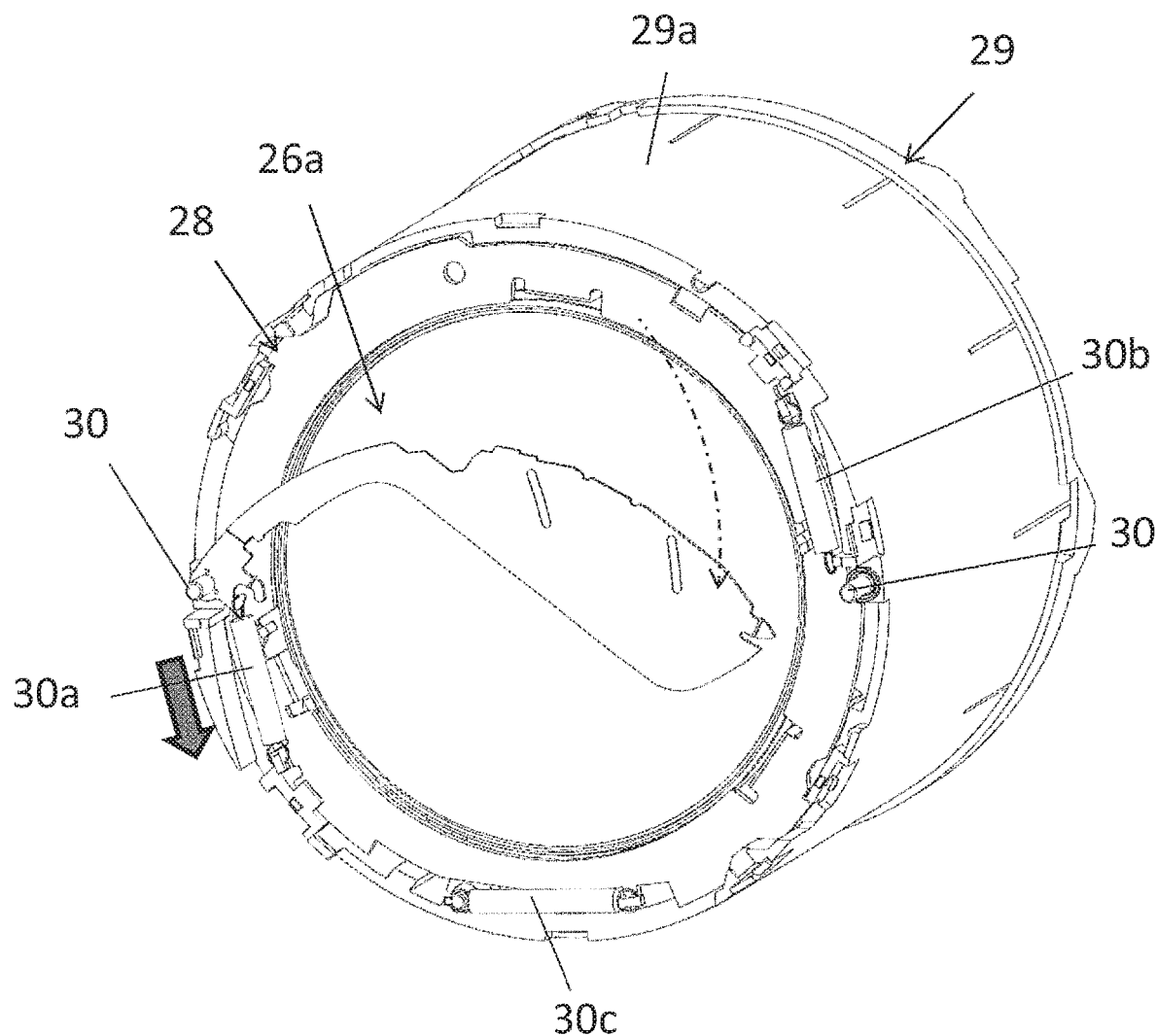
FIG. 17 is an oblique view showing the movement of a barrier vane in a transition from the imaging state (open state) to the collapsed state (closed state)

Consequently, as shown in FIG. 17, the barrier vane 26a is rotated in the closing direction toward the inner radial side by the biasing force in the direction in which the spring 30a contracts.

At this point, as shown in FIGS. 18A and 18B, as the barrier vane 26a disposed on the innermost radial side rotates, the barrier vanes 23a to 25a disposed overlapping the barrier vane 26a rotate in the same manner and in the same direction around the rotary shaft 30, resulting in a transition from the open state to the closed state.

Figures 19A, 19B:
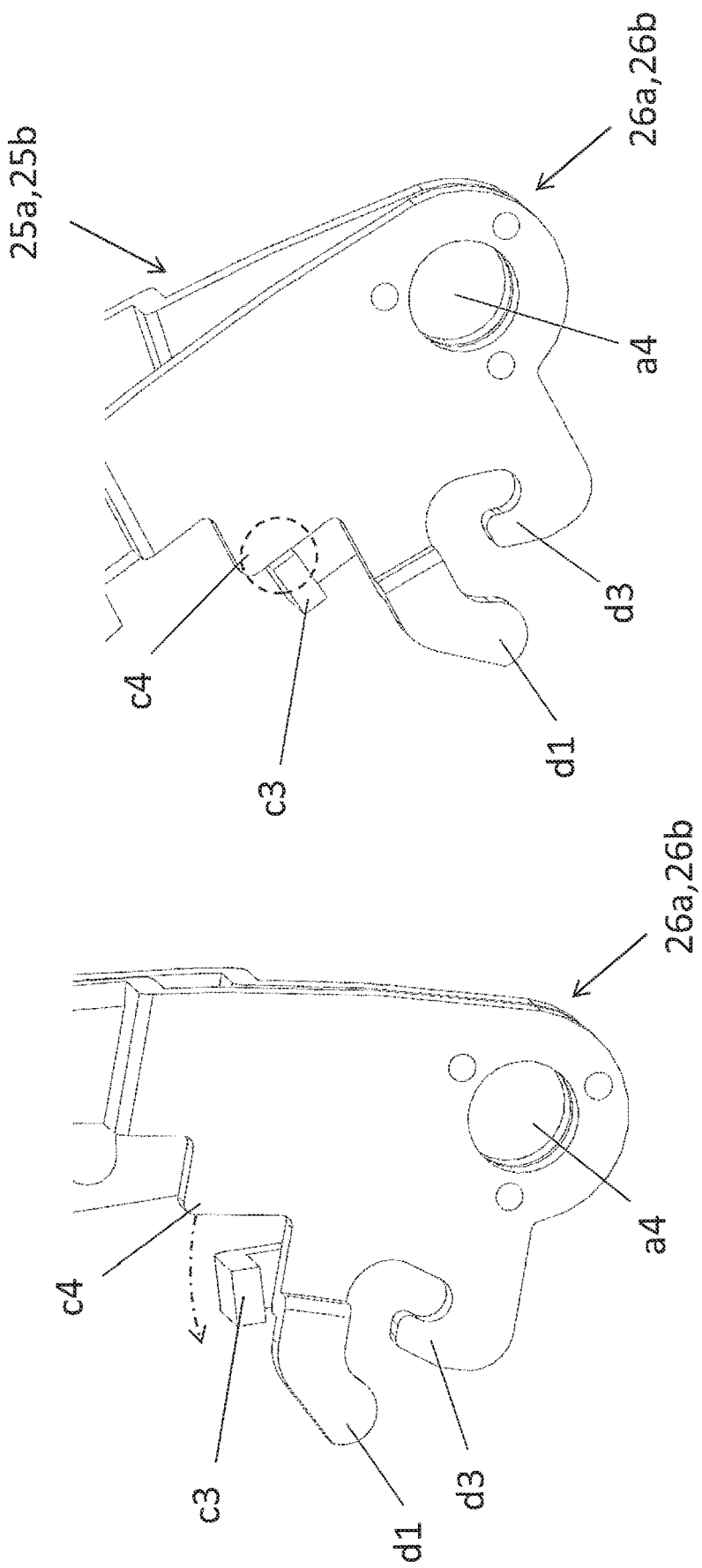
FIGS. 19A and 19B are oblique views of the latching relationship when a barrier vane rotates from FIG. 18A to FIG. 18B.

More specifically, as shown in FIG. 18B, when the barrier vane 26a is rotated in the direction of the one-dot chain line from the open state shown in FIG. 18A, end (the latching portion c4) of the barrier vane 26a catches on the latching portion c3 of the adjacent barrier vane 25a as shown in FIGS. 19A and 19B, and these rotate together. Consequently, the adjacent barrier vane 25a can also be rotated in the same direction (the closing direction) by the rotation of the barrier vane 26a.

FIGS. 19A and 19B are detail views as seen from the opposite side as in FIGS. 18A and 18B.

Figures 20A, 20B:
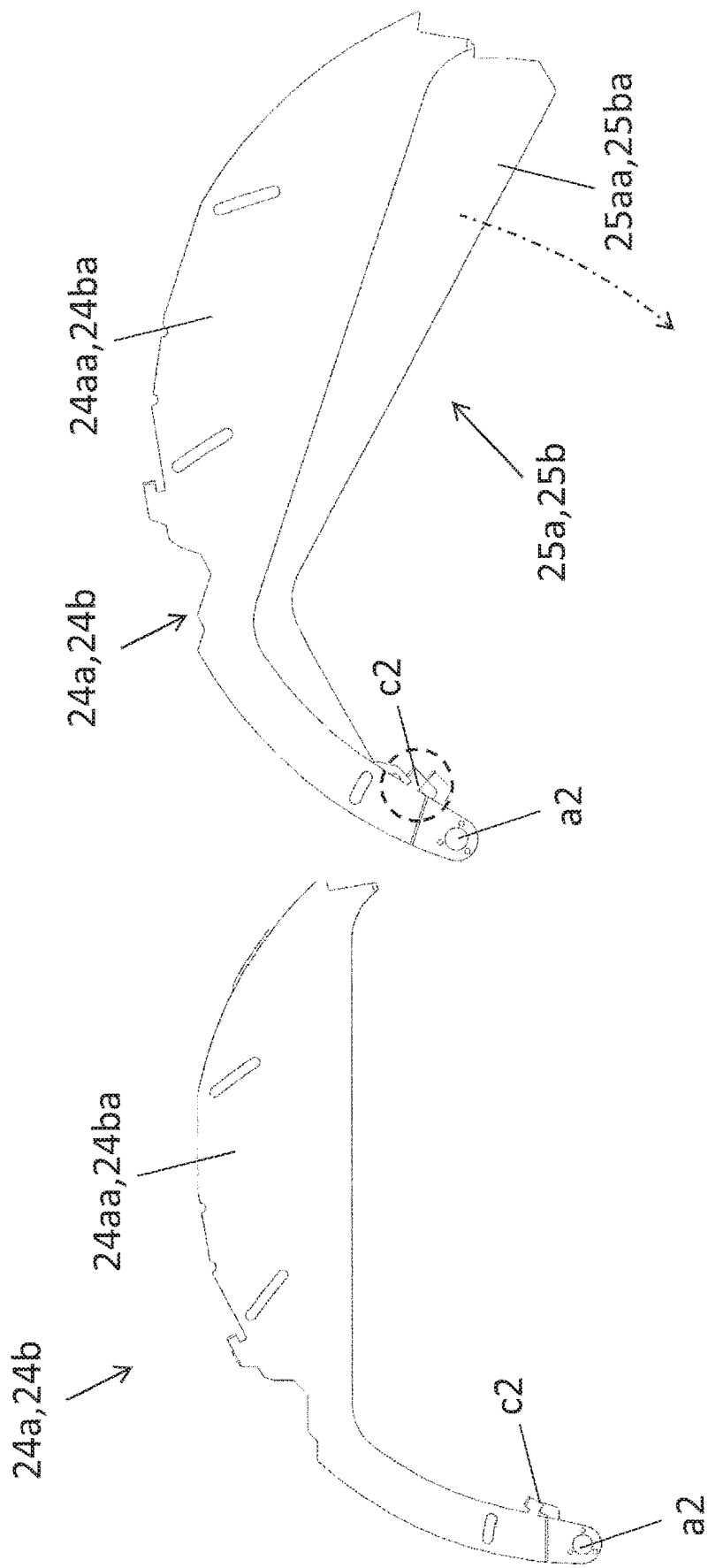
FIGS. 20A and 20B are oblique views of the movement of two barrier vanes disposed in the second and third positions from the innermost side in the radial direction in a transition from the imaging state (open state) to the collapsed state (closed state)

When the barrier vane 26a further rotates, the barrier vane 25a also rotates along with the rotation of the barrier vane 26a as shown in FIGS. 20A and 20B. As shown in FIGS. 21A and 21B, the end near the base of the barrier vane 25a catches on the latching component c2 provided near the base of the adjacent barrier vane 24a, and these rotate together. Consequently, the rotation of the barrier vane 26a allows the adjacent barrier vane 25a and the adjacent barrier vane 24a also to be rotated in the same direction (the closing direction).

FIGS. 21A and 21B are detail views as seen from the opposite side as in FIGS. 20A and 20B.

Figures 22A, 22B:
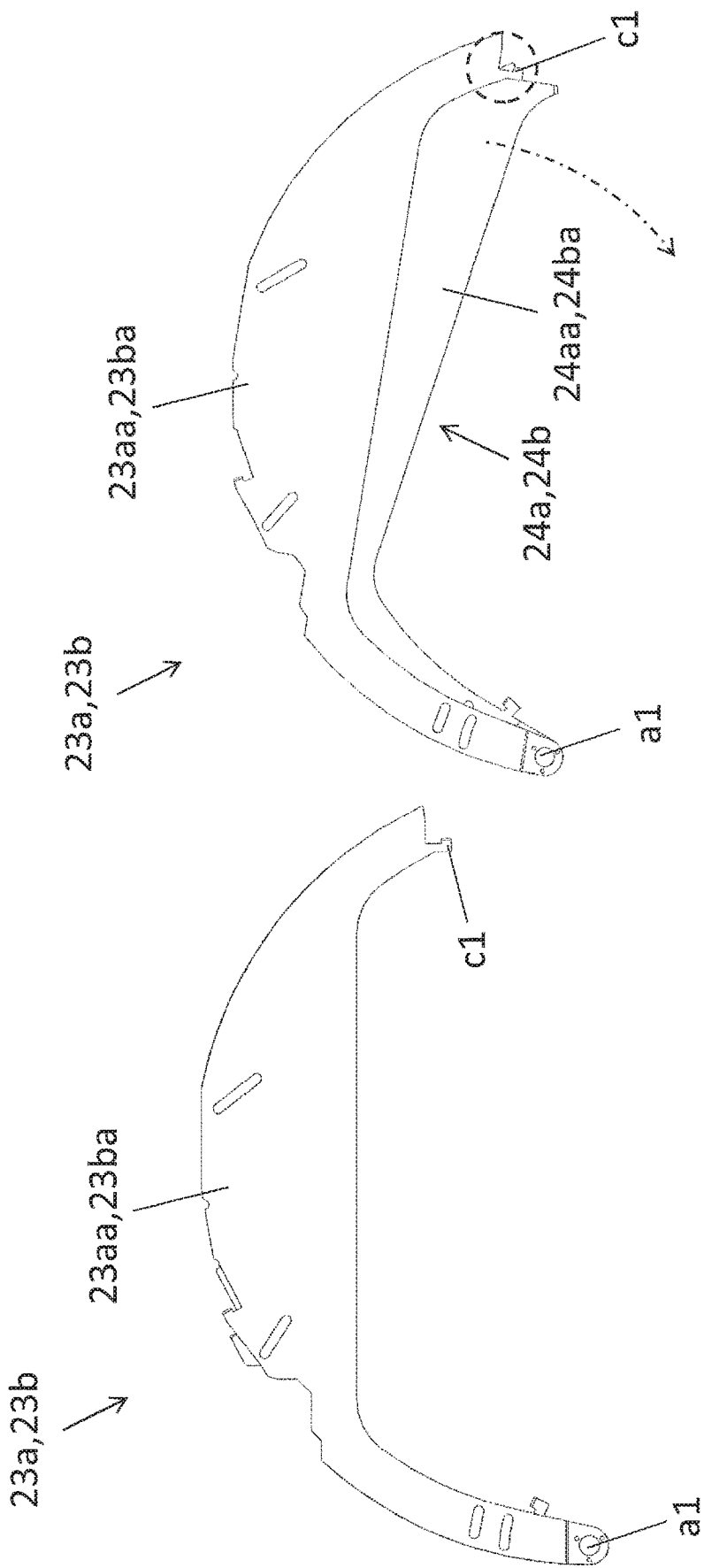
FIGS. 22A and 22B are oblique views of the movement of two barrier vanes disposed in the third and fourth positions (the fourth being the outermost in the radial direction) from the innermost side in the radial direction in a transition from the imaging state (open state) to the collapsed state (closed state)
Figure 23B:
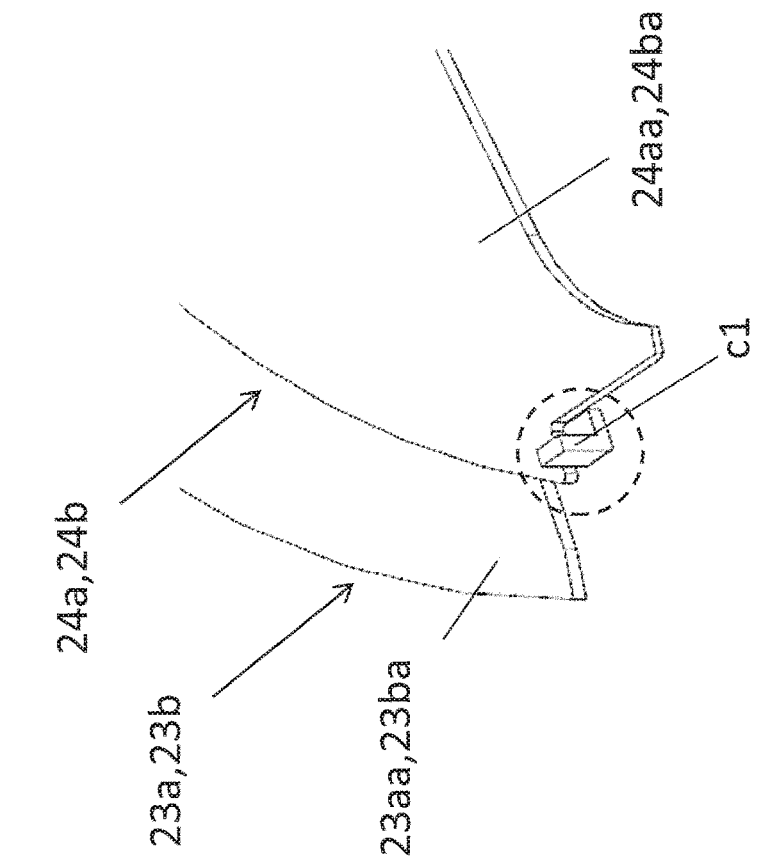
FIGS. 23A and 23B are oblique views of the latching relationship when the barrier vanes rotate from FIG. 22A to FIG. 22B.
Figure 23A:
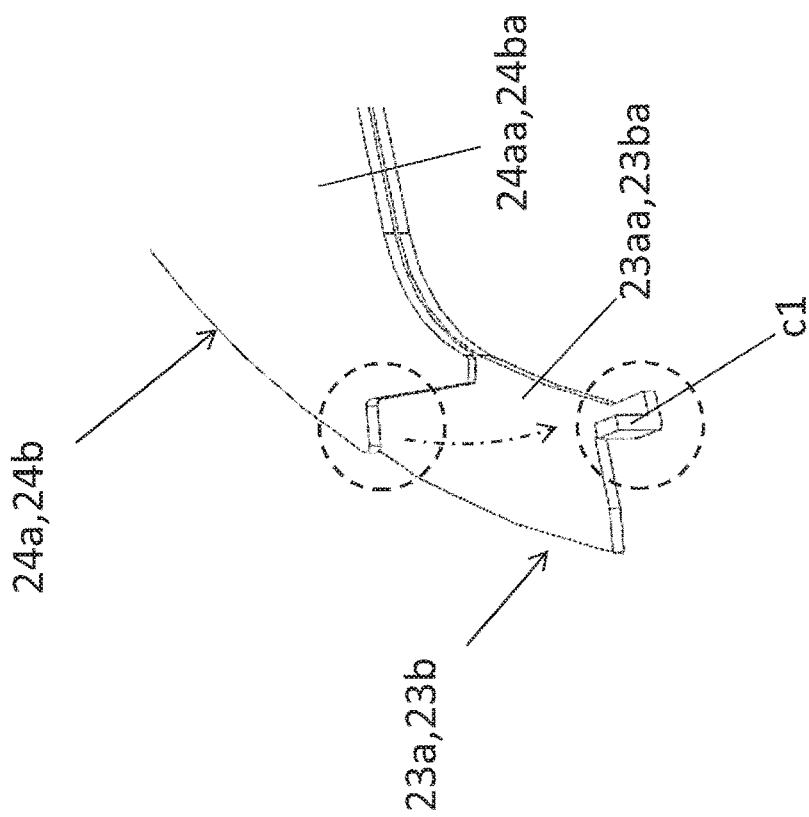

When the barrier vane 26a further rotates, the barrier vane 25a and the barrier vane 24a also rotate along with the rotation of the barrier vane 26a, as shown in FIGS. 22A and 22B. Then, as shown in FIGS. 23A and 23B, the end near the distal end of the barrier vane 24a catches on the latching component c1 provided near the distal end of the adjacent barrier vane 23a, and these rotate together. Consequently, the rotation of the barrier vane 26a allows the adjacent barrier vanes 25a, 24a, and 23a to be rotated in the same direction (the closing direction).

FIGS. 23A and 23B are detail views as seen from the opposite side as in FIGS. 22A and 22B.

Similarly, the barrier vanes 23b to 26b rotate and move from the outer peripheral portion of the first lens group frame 29 to the inner radial side, resulting in a transition from the open state to the closed state.

Figure 24:
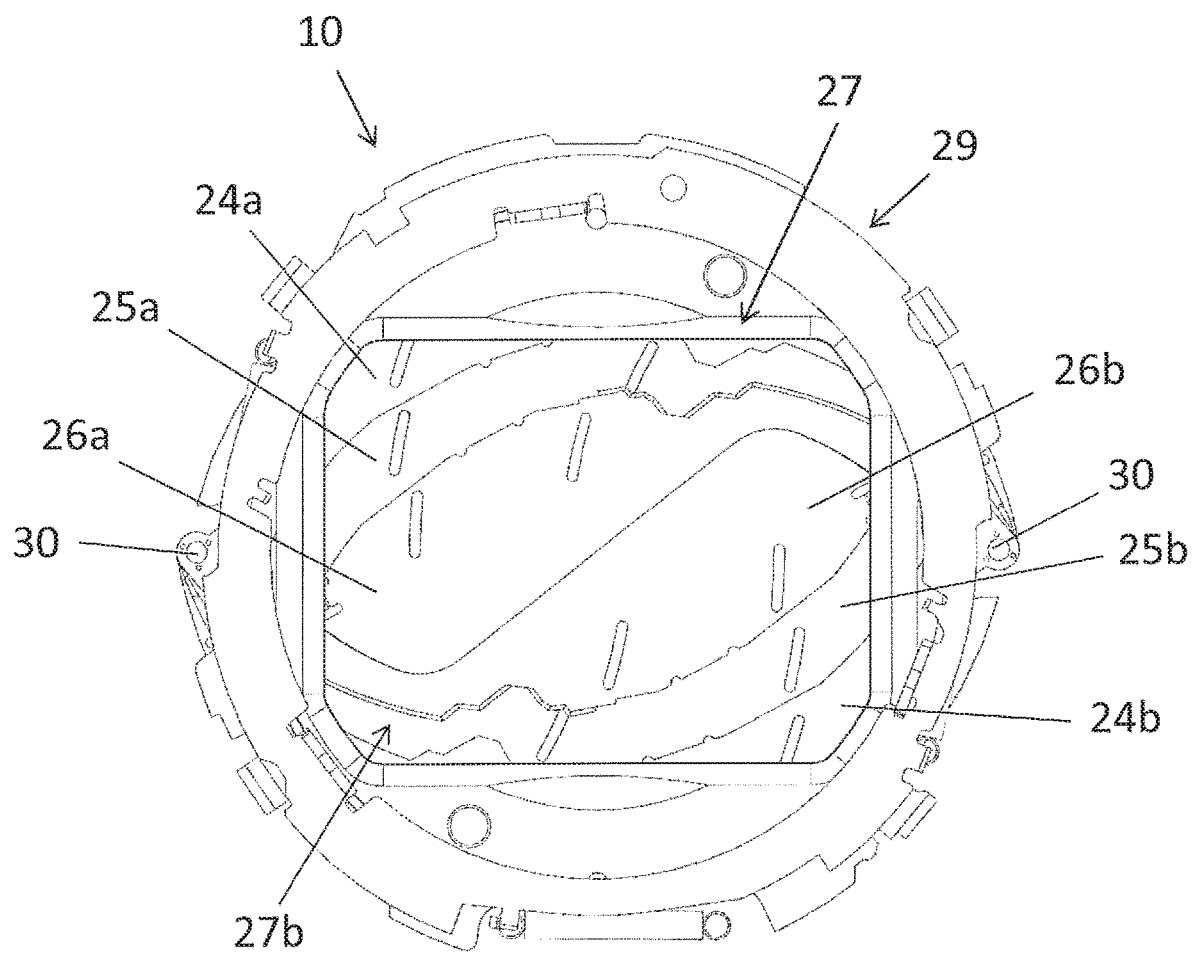
FIG. 24 is a bottom view of the closed state (collapsed state) in which the opening is covered by the barrier vanes.

Consequently, as shown in FIG. 24, the substantially rectangular opening 27b of the stationary frame 27 can be covered with the eight barrier vanes 23a to 26a and 23b to 26b (four upper and four lower) by rotating just the barrier sliding frame 28, without any rotation relative to the first lens group frame 29.

The lens barrel 10 in this embodiment has the configuration described above, and when the plurality of barrier vanes 23a to 26b are driven open and closed, the barrier sliding frame 28 is rotated relative to the first lens group frame 29 between the stationary frame 27 fixed to the first lens group frame 29 and the end face of the first lens group frame 29 on the subject side.

Here, as shown in FIGS. 6A and 6B, the stationary frame 27 is disposed on the image sensor 36 side of the barrier vanes 23a to 26a and the barrier vanes 23b to 26b, which are disposed overlapping in stacks of four, and supports the faces on the image sensor 36 side of the barrier vanes 26a and 26b disposed closest to the image sensor 36 from the side opposite to the subject.

In this embodiment, the opening 27b that is opened and closed by the barrier vanes 23a to 26b is provided to the stationary frame 27 that is fixed with respect to the first lens group frame 29. That is, the opening 27b is provided to the non-rotating stationary frame 27, rather than to the barrier sliding frame 28 that rotates with respect to the first lens group frame 29 in the opening and closing of the plurality of barrier vanes 23a to 26b.

In other words, a member (the stationary frame 27) including the opening 27b that is opened and closed by the barrier vanes 23a to 26b is provided as a member separate from the barrier sliding frame 28.

Consequently, even though the barrier sliding frame 28 rotates in the opening and closing of the barrier vanes 23a to 26b, the stationary frame 27 having the opening 27b does not rotate with respect to the first lens group frame 29 provided with the rotating shafts 30. Therefore, the maximum distance of the opening 27b from the rotating shafts 30 is kept constant, without changing.

As a result, in the operation of opening and closing the barrier vanes 23a to 26b, it is possible to prevent some of the barrier vanes 23a to 26b from coming loose due to the rotation of the opening 27b.

That is, with the lens barrel 10 in this embodiment, in a configuration in which the number of the barrier vanes 23a to 26b is increased due to the increase in the diameter of lens barrels in recent years, the outside diameter of the lens barrel 10 with respect to the opening covered by the barrier mechanism can be reduced, and the barrier vanes 23a to 26b can be prevented from coming loose from the barrier sliding frame 28 in their closed state.

In addition, since all eight of the barrier vanes 23a to 26b are flat plate-shaped members, it is possible to avoid a size increase of the lens barrel 10 in the optical axis direction, which keeps the lens barrel 10 to a compact size.

Other Embodiments

An embodiment of the present disclosure was described above, but the present disclosure is not limited to or by the above embodiment, and various modifications are possible without departing from the gist of the disclosure.

(A)

In the above embodiment, an example was described in which the opening and closing drive of the barrier vanes 23a to 26a and 23b to 26b was accomplished by utilizing a change in the positional relationship between the rectilinear frame 32 and the barrier sliding frame 28. However, the present disclosure is not limited to this.

For instance, the barrier vanes 23a to 26a and 23b to 26b may be opened and closed by using a member other than a rectilinear frame.

(B)

In the above embodiment, an example was described in which the rotating shafts 30 serving as the rotation center of the plurality of barrier vanes 23a to 26b were erected on the end face on the subject side of the stationary frame 27. However, the present disclosure is not limited to this.

For instance, the rotational axes of the plurality of barrier vanes may be provided to the face on the opposite from the subject of the stationary frame that is fixed to the subject-side end face of the first lens group frame.

(C)

In the above embodiment, an example was described in which the barrier vanes 23a to 26a and 23b to 26b were provided in two groups of four each. However, the present disclosure is not limited to this.

For instance, the configuration may be such that three barrier vanes are grouped, or the configuration may be such that five or more barrier vanes are grouped.

(D)

In the above embodiment, an example was described in which the shape of the opening 27b of the stationary frame 27 covered by the barrier vanes 23a to 26b in the collapsed state was substantially square. However, the present disclosure is not limited to this.

For instance, the shape of the opening of the stationary frame is not limited to a substantially square shape, and may be an elliptical, octagonal, or other such rectangle.

(E)

In the above embodiment, an example was described in which all of the barrier vanes 23a to 26b were made of metal. However, the present disclosure is not limited to this.

For instance, the material of the barrier vanes is not limited to metal, and may instead be some other material such as a resin.

Of the plurality of barrier vanes, the barrier vane disposed at the innermost position in the closed state is disposed at a position where it is more apt to be touched from the outside, so when strength is taken into account, just the innermost barrier vane may be made of metal, and the other barrier vanes may be made of a resin.

(F)

In the above embodiment, an example was described in which the lens barrel according to the present disclosure was applied to a lens barrel that was mounted in an imaging device such as a camera. However, the present disclosure is not limited to this.

For instance, the present disclosure may be applied to an interchangeable lens that can be detached from the camera body, or to a lens barrel used in an image pickup device for capturing moving pictures, an image projection device such as a projector, or another such device.

INDUSTRIAL APPLICABILITY

The lens barrel disclosed herein has the effect of preventing the barrier vanes from coming loose while keeping the lens barrel from becoming larger, and is therefore broadly applicable to cameras and other such imaging devices, image pickup devices for capturing moving pictures, and so forth.

The invention claimed is:

1. A lens barrel having an imaging state of being moved toward a subject in an optical axis direction, and a collapsed state in which at least some of a plurality of lenses have been collapsed, said lens barrel comprising:
   a first lens frame having a first lens disposed closest to the subject among the plurality of lenses, and a cylindrical main body that holds the first lens;
   a rotating shaft disposed substantially along the optical axis direction and near an outer peripheral portion of the first lens frame in a radial direction;
   a plurality of barrier vanes configured to rotate around the rotating shaft and switch between an open state in which the vanes expose a surface of the first lens in the imaging state and a closed state in which the vanes cover the surface of the first lens in the collapsed state;
   an annular barrier sliding frame that is disposed on a side of the subject side of the first lens frame, the annular barrier configured to rotate the plurality of barrier vanes during relative rotation around the optical axis with respect to the first lens frame; and
   an annular stationary frame that is disposed between the plurality of barrier vanes and the barrier sliding frame and is fixed with respect to the first lens frame, and supports the plurality of barrier vanes from an opposite side from the subject,
   wherein the plurality of barrier vanes have:
   a first barrier vane group including a plurality of barrier vanes that, in the open state, are disposed so as to overlap each other at an end portion of the first lens frame in the optical axis direction, and rotate in conjunction with each other toward the optical axis when there is a change from the open state to the collapsed state;
   a second barrier vane group including a plurality of barrier vanes that are disposed at opposing positions around the optical axis with respect to the first barrier vane group in the first lens frame, and that, in the open state, are disposed so as to overlap each other in the optical axis direction at the end portion of the first lens frame, and rotate in conjunction with each other toward the optical axis when there is a change from the open state to the collapsed state; and
   a first latching component configured to latch part of the barrier vanes adjacent in the optical axis direction when there is a change from the open state to the collapsed state, and a second latching component configured to latch part of the barrier vanes adjacent in the optical axis direction when there is a change from the collapsed state to the open state, the first and the second latching components being provided to the barrier vanes included in the first barrier vane group and the second barrier vane group, respectively.

2. The lens barrel according to claim 1,
   wherein the barrier vanes have a flat portion covering the surface of the first lens in the collapsed state and a side face portion intersecting with the flat portion, and
   the first latching component is provided near the side face of the barrier vanes on a side closer to the optical axis.

3. The lens barrel according to claim 1,
   wherein the barrier vanes have a flat portion covering the surface of the first lens in the collapsed state and a side face portion intersecting with the flat portion, and the second latching component is provided near the side face of the barrier vanes on a side farther away from the optical axis.

4. The lens barrel according to claim 1, wherein the first latching component is disposed at a position closer to the rotating shaft than the second latching component.

5. The lens barrel according to claim 1, wherein the first barrier vane group and the second barrier vane group each include at least four of the barrier vanes.

6. The lens barrel according to claim 1, wherein the stationary frame has a substantially quadrilateral opening.

7. The lens barrel according to claim 6, wherein the rotating shaft is provided on the outer peripheral side of the substantially quadrilateral opening of the stationary frame.

8. The lens barrel according to claim 1, wherein the rotating shaft is provided on an end face of the first lens frame on the subject side.

9. The lens barrel according to claim 1, further comprising a rectilinear frame that is disposed on the inner peripheral face side of the first lens frame, the rectilinear frame configured to move in the optical axis direction, wherein the barrier sliding frame rotates upon hitting part of the rectilinear frame when the rectilinear frame moves in the optical axis direction.

10. The lens barrel according to claim 9, wherein the barrier sliding frame has a contact component that protrudes to an opposite side from the optical axis direction on an inner peripheral face side of the first lens frame and comes into contact with part of the rectilinear frame.

11. The lens barrel according to claim 10, wherein the contact component has a tapered portion formed obliquely to the optical axis direction, and part of the rectilinear frame moves in the optical axis direction while in contact with the tapered portion.

12. The lens barrel according to claim 1, wherein the plurality of barrier vanes are substantially flat plate-shaped members.

13. The lens barrel according to claim 1, wherein the plurality of barrier vanes are all made of metal.

14. An imaging device comprising the lens barrel according to claim 1.

* * * * *